United States Patent
Moini et al.

(10) Patent No.: US 12,428,305 B2
(45) Date of Patent: Sep. 30, 2025

(54) ZEOLITE STRUCTURE SYNTHESIZED USING MIXTURES OF ORGANIC STRUCTURE DIRECTING AGENTS

(71) Applicant: BASF MOBILE EMISSIONS CATALYSTS LLC, Iselin, NJ (US)

(72) Inventors: Ahmad Moini, Iselin, NJ (US); Eduard L. Kunkes, Iselin, NJ (US); Jonelle Charmaine Thomas, Charlotte, NC (US); Vivek Vattipalli, Iselin, NJ (US); Christopher R. Castellano, Ringoes, NJ (US)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 565 days.

(21) Appl. No.: 17/757,302

(22) PCT Filed: Feb. 9, 2021

(86) PCT No.: PCT/US2021/017261
§ 371 (c)(1),
(2) Date: Jun. 14, 2022

(87) PCT Pub. No.: WO2022/173419
PCT Pub. Date: Aug. 18, 2022

(65) Prior Publication Data
US 2023/0348287 A1 Nov. 2, 2023

(51) Int. Cl.
*C01B 39/02* (2006.01)
*B01D 53/94* (2006.01)
*B01J 29/72* (2006.01)

(52) U.S. Cl.
CPC .......... *C01B 39/02* (2013.01); *B01D 53/9418* (2013.01); *B01J 29/723* (2013.01);
(Continued)

(58) Field of Classification Search
None
See application file for complete search history.

(56) References Cited

U.S. PATENT DOCUMENTS

| | | | |
|---|---|---|---|
| 2015/0265969 A1* | 9/2015 | Fedeyko | B01J 37/0215 422/171 |
| 2016/0122193 A1 | 5/2016 | Lai et al. | |

(Continued)

FOREIGN PATENT DOCUMENTS

| | | |
|---|---|---|
| CN | 108602683 A | 9/2018 |
| CN | 110054197 A | 7/2019 |

(Continued)

OTHER PUBLICATIONS

Zhu, Jie et al., "Understanding the high hydrothermal stability and NH3—SCR activity of the fast-synthesized ERI zeolite", *Journal of Catalysis*, vol. 391, Sep. 7, 2020, pp. 346-356.

(Continued)

*Primary Examiner* — Colin W. Slifka
(74) *Attorney, Agent, or Firm* — DLA Piper LLP (US)

(57) ABSTRACT

The disclosure provides methods of preparing small pore zeolites, the method including using a first organic structure-directing agent and a second organic structure-directing agent to crystallize the zeolites, wherein the first organic structure-directing agent is bis-quaternary ammonium cations, and the second organic structure-directing agent is mono-quaternary ammonium cations. Further disclosed are small pore zeolites having a controlled framework aluminum distribution, and selective catalytic reduction catalyst compositions, articles, and systems including such zeolites promoted with a metal.

13 Claims, 8 Drawing Sheets

(52) U.S. Cl.
CPC ...... *B01D 2255/50* (2013.01); *B01D 2257/40* (2013.01); *B01D 2258/01* (2013.01)

(56) References Cited

U.S. PATENT DOCUMENTS

2018/0093255 A1    4/2018    Chen et al.
2020/0392009 A1    12/2020    Li et al.

FOREIGN PATENT DOCUMENTS

CN          110316743 A    10/2019
WO    WO 2020/132462 A1    6/2020

OTHER PUBLICATIONS

Wu, L. Leilei, "Mesoporous CHA and MFI zeolite catalysts for methanol conversion reactions", Jan. 1, 2014, URL: https://research.tue.nl/files/3843523/762548.pdf.
Extended European Search Report from corresponding European Patent Application No. 21901676.3 dated Mar. 13, 2023.
International Search Report dated Nov. 1, 2021, PCT/US2021/017261.

\* cited by examiner

ZEOLITE STRUCTURE SYNTHESIZED USING MIXTURES OF ORGANIC STRUCTURE DIRECTING AGENTS This application is a national stage filing under 35 U.S.C. § 371 of International Application No. PCT/US2021/017261, filed on Feb. 9, 2021, which the is incorporated herein by reference in its entirety.

FIELD OF THE DISCLOSURE

The present disclosure relates to methods for the preparation of zeolites, catalyst compositions comprising such zeolites, and to catalyst articles and systems employing such catalyst compositions.

BACKGROUND OF THE DISCLOSURE

Various treatment methods have been used for the treatment of $NO_x$-containing gas mixtures to decrease atmospheric pollution, One type of treatment involves catalytic reduction of nitrogen oxides. There are two processes: (1) a nonselective reduction process wherein carbon monoxide, hydrogen, or a hydrocarbon is used as a reducing agent; and (2) a selective reduction process wherein ammonia or an ammonia precursor is used as a reducing agent. In the selective reduction process, a high degree of nitrogen oxide removal can be achieved with a small amount of reducing agent, resulting in the formation predominantly of nitrogen and steam according to the following equations:

$4NO+4NH_3+O_2 \rightarrow 4N_2+6H_2O$ (standard SCR reaction)

$2NO_2+4NH_3 \rightarrow 3N_2+6H_2O$ (slow SCR reaction)

$NO+NO_2+2NH_3 \rightarrow 2N_2+3H_2O$ (fast SCR reaction)

Catalysts employed in the SCR process ideally should be able to retain good catalytic activity over a wide range of temperature conditions of use, for example; 200° C. to 600° C. or higher, under hydrothermal conditions. SCR catalysts are commonly employed in hydrothermal conditions, such as during the regeneration of a soot filter, a component of the exhaust gas treatment system used for the removal of particles.

Current catalysts employed in the SCR process include molecular sieves, such as zeolites, ion-exchanged with a catalytic metal such as iron or copper. Metal-promoted zeolite catalysts including, among others, iron-promoted and copper-promoted zeolite catalysts are known for the selective catalytic reduction of nitrogen oxides with ammonia. Particularly, copper exchanged small-pore zeolites having for example the chabazite (CHA) and AEI frameworks serve as catalysts for the selective catalytic reduction (SCR) of $NO_x$ with ammonia or a secondary ammonia source.

Increasingly stringent emissions regulations have driven the need for developing SCR catalysts with improved capacity to manage $NO_x$ emissions, particularly under lean, low engine exhaust temperature conditions, while also exhibiting sufficient high temperature thermal stability. There is a need for zeolitic materials with tailored adsorption and catalytic functions, and for methods of making small pore zeolites, such as zeolites having the CHA framework, that are efficient and low cost, but that also provide materials with suitable properties, for example; for SCR catalysis. Particularly, there is a continuing need in the art for SCR catalysts effective to abate $NO_x$ emissions from exhaust gas streams efficiently and effectively.

The catalytic properties of zeolites are defined not only by their framework connectivity, but also by the microscopic atomic arrangement of framework aluminum (Al) atoms that generate catalytic active sites, Specifically, aluminum distribution in zeolites has been linked to the numbers and structures of extra-framework metal ions (e.g., $Cu^{2+}$, $(CuOH)_+$) that can be exchanged onto the zeolite. The density and distribution of catalytically active Cu sites in the zeolite depends on the siting and proximity of aluminum atoms within the zeolite framework structure. Enhancing the proportion as well as the density of useful Cu in the zeolite would serve to improve catalytic performance of the zeolite without altering the product silica-to-alumina ratio (SAR).

It was recently reported that Al distribution in CHA zeolites can be controlled by the use of inorganic cations such as $Na^+$ with trimethyladamantylammonium cation (TMAda) as the organic structure-directing agent (OSDA) due to incorporation of both $TMAda^+$ and $Na^+$ cations in the CHA cage during synthesis, and the relative ratio of $TMAda^+$ and $Na^+$ in the synthesis gel can be used to control the extent of Al pairing in the zeolite product. See Gounder and Di Iorio, Chem, Mater., 2016, 28(7), 2236-2247).

Despite such advances, there remains a significant need in the art for synthetic procedures that provide zeolitic materials with tailored adsorption and catalytic functions by manipulating the type and amount of structure-directing agents used in the synthesis gel to control for example, aluminum siting and proximity in the zeolitic materials.

SUMMARY OF THE DISCLOSURE

The present disclosure generally describes the use of a combination of two organic structure directing agents (OSDAs) with varied structures to template zeolite synthesis, enabling the control of zeolite framework structure and aluminum distribution in the product zeolite.

Surprisingly, according to the present disclosure, it has been found that using a combination of certain mono- and bis-quaternary ammonium ion organic structure-directing agents (OSDAs) in the zeolite synthesis gel provided a zeolite with a CHA crystalline framework structure with altered Al siting and pairing in the zeolite product, as demonstrated by the difference in equilibrium Cu uptake when compared to CHA zeolites synthesized with a single, mono-quaternary ammonium ion organic structure directing agent.

Accordingly, in one aspect, the disclosure provides a method of synthesizing a small pore zeolite, the method comprising preparing a mixture of water, an aluminum source, a silicon source, a source of a first organic structure-directing agent, and a source of a second organic structure-directing agent to form a synthesis gel; and subjecting the synthesis gel to a crystallization process to crystallize the small pore zeolite; wherein the first organic structure-directing agent is bis-quaternary ammonium cations, and the second organic structure-directing agent is mono-quaternary ammonium cations.

In another aspect, the disclosure provides a method of synthesizing a small pore zeolite, the method comprising:
preparing a mixture of water, an aluminum source, a silicon source, a source of a first organic structure-directing agent, and a source of a second organic structure-directing agent to form a synthesis gel; and
subjecting the synthesis gel to a crystallization process to crystallize the small pore zeolite;
wherein the first organic structure-directing agent comprises a bis-quaternary ammonium cation, a derivative of the bis-quaternary ammonium cation, or a combination thereof, and the second organic structure-directing agent comprises a mono-quaternary ammonium cation, a derivative of the mono-quaternary ammonium cation, or a combination thereof.

In some embodiments, the small pore zeolite is a cage-containing structure, wherein the diameter of the largest possible included sphere in the cage-containing structure is from about 4.4 Å to about 15 Å.

In some embodiments, the bis-quaternary ammonium cations comprises from about 8 to about 20 carbon atoms. In some embodiments, each nitrogen atom of the bis-quaternary ammonium cations bears four substituents, and wherein each substituent is independently selected from the group consisting of alkyl, alkenyl, aryl, arylalkyl, and combinations thereof. In some embodiments, the bis-quaternary ammonium cations have a structure represented by Formula I:

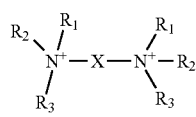

(I)

wherein:
each of substituents $R_1$, $R_2$, and $R_3$ is methyl or ethyl; or optionally, both $R_3$ groups are joined to form a —$(CH_2)_n$— bridge, where n is an integer from 1 to 3; and
X is selected from the group consisting of alkyl, cycloalkyl, alkenyl, aryl, arylalkyl, and combinations thereof.

In some embodiments, the bis-quaternary ammonium cations are selected from the group consisting of N1,N1,N1,N3,N3,N3-hexaethylpropane-1,3-diaminium, N1,N1,N1,N4,N4,N4-hexamethylbutane-1,4-diaminium, N1,N1,N1,N4,N4,N4-hexaethylbutane-1,4-diaminium, (E)-N1,N1,N1,N4,N4,N4-hexamethylbut-2-ene-1,4-diaminium, N1,N1,N1,N5,N5,N5-hexamethylpentane-1,5-diaminium, (E)-N1,N1,N1,N5,N5,N5-hexamethylpent-2-ene-1,5-diaminium, N1,N1,N1,N6,N6,N6-hexamethylhexane-1,6-diaminium, (E)-N1,N1,N1,N6,N6,N6-hexamethylhex-2-ene-1,6-diaminium, (2E,4E)-N1,N1,N1,N6,N6,N6-hexamethylhexa-2,4-diene-1,6-diaminium, N1,N1,N1,N7,N7,N7-hexamethylheptane-1,7-diaminium, N1,N1,N1,N8,N8,N8-hexamethyloctane-1,8-diaminium, N1,N1,N1,N3,N3,N3-hexamethylcyclohexane-1,3-diaminium, N1,N1,N1,N3,N3,N3-hexamethylbicyclo[2.2.1]heptane-1,3-diaminium, N1,N1,N1,N3,N3,N3-hexamethylbenzene-1,3-diaminium, N1,N1,N1,N4,N4,N4-hexamethylcyclohexane-1,4-diaminium, N1,N1,N1,N4,N4,N4-hexamethylbicyclo[2.2.1]heptane-1,4-diaminium, N1,N1,N1,N4,N4,N4-hexamethylbicyclo[2.2.2]octane-1,4-diaminium, N1,N1,N1,N4,N4,N4-hexamethylbenzene-1,4-diaminium, 1,1,4,4-tetramethylpiperazine-1,4-diium, 1,1,3,3-tetramethylhexahydropyrimidine-1,3-diium, 1,1'-(1,3-phenylene)bis(N,N,N-trirnethylmethanaminium), 1,1'-(1,4-phenylene)bis(N,N,N-trimethylmethanaminium), or a combination thereof.

In some embodiments, the source of the first organic structure-directing agent is a bis-quaternary ammonium compound comprising the bis-quaternary ammonium cations and balancing anions selected from the group consisting of OH⁻, Cl⁻, and Br⁻. In some embodiments, the source of the first organic structure-directing agent comprises hexamethonium or octamethonium cations. In some embodiments, the source of the first organic structure-directing agent is hexamethonium dihydroxide (HMOH) or octamethonium dihydroxide (OMOH).

In some embodiments, the mono-quaternary ammonium cations comprises from about 4 to about 14 carbon atoms. In some embodiments, the nitrogen atom of the mono-quaternary ammonium cations bears four substituents, wherein each substituent is independently selected from the group consisting of alkyl, alkenyl, aryl, arylalkyl, and combinations thereof. In some embodiments, the mono-quaternary ammonium cations have a structure represented by Formula II:

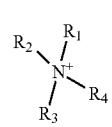

(II)

wherein:
$R_1$, $R_2$, and $R_3$ are each methyl or ethyl; and
$R_4$ is selected from the group consisting of methyl, ethyl, hydroxyethyl, cyclohexyl, azabicycloheptyl, adamantly, and phenyl;
or optionally, $R_3$ and $R_4$ together, or $R_2$, $R_3$, and $R_4$ together, may be joined to form a mono- or bicylic ring system, which may optionally be substituted with one or more methyl or OH groups.

In some embodiments, the mono-quaternary ammonium cations are selected from the group consisting of tetraethylammonium, 2-hydroxy-N,N,N-trimethylethan-1-aminium, N,N,N-trimethylcyclohexanaminium, N,N,N-trimethyladamantan-1-aminium (TMAda), N,N,N-trirnethylbicyclo[2.2.1]heptan-2-aminium, N,N,N-trimethylbenzenaminium, 1,1-dirnethylpiperidin-1-ium, 1,1,3,5-tetramethylpiperidin-1-ium, 1-methylquinuclidin-1-ium, 3-hydroxy-1-methylquinuclidin-1-ium, or a combination thereof.

In some embodiments, the source of the second organic structure-directing agent is a mono-quaternary ammonium compound comprising the mono-quaternary ammonium cations and balancing anions selected from the group consisting of OH⁻, Cl⁻, and Br⁻. In some embodiments, the source of the second organic structure-directing agent comprises N,N,N-trimethyladamantan-1-aminium cations. In some embodiments, the source of the second organic structure-directing agent is N,N,N-trimethyladamantan-1-aminium hydroxide (TMAdaOH), In some embodiments, the source of the first organic structure-directing agent is HMOH or OMOH, and the source of the second organic structure-directing agent is TMAdaOH.

In some embodiments, a molar ratio of the first organic structure-directing agent to the second organic structure-directing agent is in the range of from about 0.001 to about 1000. In some embodiments, the molar ratio of the first organic structure-directing agent to the second organic structure-directing agent is from about 0.1 to about 10. In some embodiments, the molar ratio of the first organic structure-directing agent to the second organic structure-directing agent is from about 0.5 to about 2.

In some embodiments, the mixture further comprises an inorganic structure-directing agent, wherein the inorganic structure-directing agent is alkali metal cations or alkaline earth metal cations. In some embodiments, the alkali metal cations are selected from the group consisting of lithium, sodium, potassium or cesium.

In some embodiments, the source of aluminum comprises one or more of an aluminum salt, aluminum metal, an aluminum oxide, an aluminosilicate, or a zeolite. In some embodiments, the source of aluminum comprises a zeolite having the FAU, LTA, LTL, MFI, or BEA crystalline framework. In some embodiments, the source of aluminum is zeolite Y in the Na+ form.

In some embodiments, the source of silicon is colloidal silica, a silicon alkoxide compound, an alkali metal silicate, fumed silica, amorphous silica, or an aluminosilicate. In some embodiments, the source of silicon is sodium silicate. In some embodiments, an OH/Si ratio of the synthesis gel is from about 0.03 to about 1.0.

In some embodiments, the crystallization process comprises maintaining the synthesis gel at a temperature of from about 90° C. to about 250° C. In some embodiments, the crystallization process comprises maintaining the synthesis gel at a temperature of from about 120° C. to about 200° C.

In some embodiments, the method further comprises filtering the crystals formed during the heating step.

In some embodiments, the method further comprises calcining the zeolite at a temperature of from about 450° C. to about 750° C.

In some embodiments, the small pore zeolite has a crystalline framework structure type selected from the group consisting of AEI, AFT, AFX, AFV, AVL, CHA, EAB, ERI, ITW, KFI, LEV, LTA, MER, SAS, SAT, and SAV. In some embodiments, the small pore zeolite has a crystalline framework structure type selected from the group consisting of AEI, AFV, AVL, CHA, EAB, ITW, KFI, LEV, LTA, MER, SAS, SAT, and SAV. In some embodiments, the small pore zeolite has an AEI or CHA crystalline framework structure type. In some embodiments, the small pore zeolite has a CHA crystalline framework structure type.

In some embodiments, the small pore zeolite has a silica-to-alumina ratio (SAR) of from about 6 to about 100. In some embodiments, the small pore zeolite has a silica-to-alumina ratio (SAR) of from about 10 to about 30. In some embodiments, the small pore zeolite has a SAR in the range of about 20 to about 30.

In some embodiments, the small pore zeolite has an MSA that is less than about 75 m²/g; and a ZSA that is at least about 450 m²/g.

In some embodiments, the small pore zeolite has a controlled aluminum distribution comprising an altered aluminum siting and pairing arrangement characterized by an altered equilibrium $Cu^{+2}$ uptake at a $Cu^{-2}$ concentration greater than 0.25 M, as compared to a small pore zeolite synthesized with only a mono-quaternary OSDA.

In some embodiments, prior to calcining, at least a portion of the pores of the small pore zeolite are occupied by the bis-quaternary ammonium cations, and at least a portion of the pores are occupied by the mono-quaternary ammonium cations. In some embodiments, from about 1 to about 99% of the pores are occupied by the bis-quaternary ammonium cations, and from about 99 to about 1% of the pores are occupied by the mono-quaternary ammonium cations. In some embodiments, from about 60 to about 40% of the pores are occupied by the bis-quaternary ammonium cations, and from about 40 to about 60% of the pores are occupied by the mono-quaternary ammonium cations.

In another aspect is provided a small pore zeolite prepared according to the method disclosed herein.

In some embodiments, the small pore zeolite has a controlled aluminum distribution, the controlled aluminum distribution comprising an arrangement of anionic framework Al centers comprising an altered aluminum siting and pairing arrangement characterized by an altered equilibrium $Cu^{+2}$ uptake at a $Cu^{-2}$ concentration greater than 0.25 M, as compared to a small pore zeolite synthesized with only a mono-quaternary OSDA. In some embodiments, the small pore zeolite comprises a cage-containing structure, wherein the diameter of the largest possible included sphere in the cage-containing structure is from about 4.4 Å to about 15 Å

In a further aspect is provided a small pore zeolite, wherein at least a portion of the pores of the small pore zeolite are occupied by bis-quaternary ammonium cations, and at least a portion of the pores are occupied by mono-quaternary ammonium cations. In some embodiments, the small pore zeolite comprises a cage-containing structure, wherein the diameter of the largest possible included sphere in the cage-containing structure is from about 4.4 Å to about 15 Å.

In some embodiments, from about 1 to about 99% of the pores are occupied by bis-quaternary ammonium cations, and from about 99 to about 1% of the pores are occupied by mono-quaternary ammonium cations. In some embodiments, from about 60 to about 40% of the pores are occupied by bis-quaternary ammonium cations, and from about 40 to about 60% of the pores are occupied by mono-quaternary ammonium cations.

In some embodiments, the bis-quaternary ammonium cations comprise from about 8 to about 20 carbon atoms. In some embodiments, each nitrogen atom of the bis-quaternary ammonium cations bears four substituents, and wherein each substituent is independently selected from the group consisting of alkyl, alkenyl, aryl, arylalkyl, and combinations thereof. In some embodiments, the bis-quaternary ammonium cations have a structure represented by Formula I:

wherein:
  each of substituents $R_1$, $R_2$, and $R_3$ is methyl or ethyl; or optionally, both $R_3$ groups are joined to form a —$(CH_2)_n$— bridge, where n is an integer from 1 to 3; and
  X is selected from the group consisting of alkyl, cycloalkyl, alkenyl, aryl, arylalkyl, and combinations thereof.

In some embodiments, the bis-quaternary ammonium cations are N1,N1,N1,N3,N3,N3-hexaethylpropane-1,3-diaminium, N1,N1,N1,N4,N4,N4-hexamethylbutane-1,4-diaminium, N1,N1,N1,N4,N4,N4-hexaethylbutane-1,4-diaminium, (E)-N1,N1,N1,N4,N4,N4-hexamethylbut-2-ene-1,4-diaminium, N1,N1,N1,N5,N5,N5-hexamethylpentane-1,5-diaminium, (E)-N1,N1,N1,N5,N5,N5-hexamethylpent-2-ene-1,5-diaminium, N1,N1,N1,N6,N6,N6-hexamethylhexane-1,6-diaminium(hexamethonium), (E)-N1,N1,N1,N6,N6,N6-hexamethylhex-2-ene-1,6-diaminium, (2E,4E)-N1,N1,N1,N6,N6,N6-hexamethylhexa-2,4-diene-1,6-diaminium, N1,N1,N1,N7,N7,N7-hexamethylheptane-1,7-diaminium, N1,N1,N1,N8,N8,N8-hexamethyloctane-1,8-diaminium (octamethonium), N1,N1,N1,N3,N3,N3-hexamethylcyclohexane-1,3-diaminium, N1,N1,N1,N3,N3,N3-hexamethylbicyclo[2.2.1]-heptane-1,3-diaminium, N1,N1,N1,N3,N3,N3-hexamethylbenzene-1,3-diaminium, N1,N1,N1,N4,N4,N4-hexamethylcyclohexane-1,4-diaminium, N1,N1,N1,N4,N4, N4-hexamethylbicyclo[2.2.1]heptane-1,4-diaminium, N1,N1,N1,N4,N4,N4-hexamethylbicyclo[2.2.2]octane-1,4-diaminium, N1,N1,N1,N4,N4,N4-hexamethylbenzene-1,4-diaminium, 1,1,4,4-tetramethylpiperazine-1,4-diium, 1,1,3,3-tetramethylhexahydropyrimidine-1,3-diium, 1,1'-(1,3-phenylene)bis(N,N,N-trimethylmethanaminium), 1,1'-(1,4-phenylene)bis(N,N,N-trimethylmethanaminium), or a combination thereof. In some embodiments, the bis-quaternary ammonium cations are hexamethonium or octamethonium.

In some embodiments, the mono-quaternary ammonium cations comprise from about 4 to about 14 carbon atoms. In some embodiments, the nitrogen atom of the mono-quaternary ammonium cations bears four substituents, wherein each substituent is independently selected from the group consisting of alkyl, alkenyl, aryl, arylalkyl, and combinations thereof. In some embodiments, the mono-quaternary ammonium cations have a structure represented by Formula II:

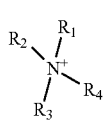

wherein:
$R_1$, $R_2$, and $R_3$ are each methyl or ethyl; and
$R_4$ is selected from the group consisting of methyl, ethyl, hydroxyethyl, cyclohexyl, azabicycloheptyl, adamantly, and phenyl;
or optionally, $R_3$ and $R_4$ together, or $R_2$, $R_3$, and $R_4$ together, may be joined to form a mono- or bicyclic ring system, which may optionally be substituted with one or more methyl or OH groups.

In some embodiments, the mono-quaternary ammonium cations are tetraethylammonium, 2-hydroxy-N,N,N-trimethylethan-1-aminium. N,N,N-trimethylcyclohexanaminium, N,N,N-trimethyladamantan-1-aminium (TMAda), N,N,N-trimethylbicyclo[2.2.1]heptan-2-aminium, N,N,N-trimethylbenzenaminium, 1,1-dimethylpiperidin-1-ium, 1,1,3,5-tetramethylpiperidin-1-ium, 1-methylquinuclidin-1-ium, 3-hydroxy-1-methylquinucildin-1-ium, or a combination thereof. In some embodiments, the mono-quaternary ammonium cations are TMAda. In some embodiments, the bis-quaternary ammonium cations are hexamethonium or octamethonium, and the mono-quaternary ammonium cations are TMAda.

In some embodiments, the small pore zeolite has a crystalline framework structure type selected from the group consisting of AEI, AFT, AFX, AFV, AVL, CHA, EAB, ERI, ITW, KR, LEV, LTA, MER, SAS, SAT, and SAV. In some embodiments, the small pore zeolite has a crystalline framework structure type selected from the group consisting of AEI, AFV, AVL, CHA, EAB, ITW, KFI, LEV, LTA, MER, SAS, SAT, and SAV. In some embodiments, the small pore zeolite has an AEI or CHA crystalline framework structure type. In some embodiments, the small pore zeolite has a CHA crystalline framework structure type.

In some embodiments, the small pore zeolite has a silica-to-alumina ratio (SAR) of from about 6 to about 100. In some embodiments, small pore zeolite has a silica-to-alumina ratio (SAR) of from about 10 to about 30. In some embodiments, the small pore zeolite has a SAR in the range of about 20 to about 30.

In some embodiments, the small pore zeolite has an MSA that is less than about 75 $m^2/g$; and a ZSA that is at least about 450 $m^2/g$.

In a further aspect is provided a selective catalytic reduction (SCR) catalyst composition effective for the abatement of nitrogen oxides ($NO_x$) in an exhaust gas stream, the SCR catalyst comprising the small pore zeolite as disclosed herein, promoted with a promoter metal. In some embodiments, the promoter metal is present in an amount of about 1.0 wt % to about 10 wt %, based on the total weight of the SCR catalyst, and calculated as the metal oxide. In some embodiments, the promoter metal is present in an amount of about 4 to about 6 wt %, In some embodiments, the promoter metal is selected from iron, copper, and combinations thereof.

In another aspect is provided a SCR catalyst article effective to abate nitrogen oxides (NOx) from an engine exhaust gas stream, the SCR catalyst article comprising a substrate having the SCR catalyst composition as disclosed herein disposed on at least a portion thereof. In some embodiments, the substrate is a honeycomb substrate. In some embodiments, the honeycomb substrate is a flow-through substrate or a wall-flow filter.

In yet another aspect is provided an exhaust gas treatment system comprising the SCR catalyst article as disclosed herein, positioned downstream from and in fluid communication with an engine that produces an exhaust gas stream In a still further aspect is provided a method of treating an exhaust gas stream, the method comprising contacting the exhaust gas stream with the SCR catalyst article, or the exhaust gas treatment system, each as disclosed herein.

These and other features, aspects, and advantages of the disclosure will be apparent from the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention; The drawings are exemplary only, and should not be construed as limiting the invention.

DETAILED DESCRIPTION

Figure 1:
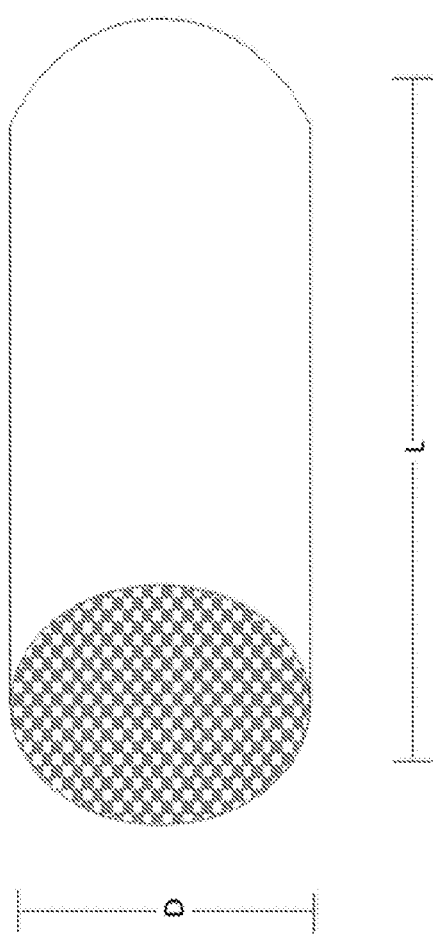
FIG. 1 is a perspective view of a honeycomb-type substrate which may comprise a catalyst (i.e., a selective catalytic reduction catalyst) washcoat composition in accordance with the present disclosure.

Before describing several exemplary embodiments of the invention, it is to be understood that the invention is not limited to the details of construction or process steps set forth in the following description. The invention is capable of other embodiments and of being practiced or being carried out in various ways. Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

With respect to the terms used in this disclosure, the following definitions are provided.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

The articles "a" and "an" are used herein to refer to one or to more than one (i.e., to at least one) of the grammatical object of the article.

Any ranges cited herein are inclusive.

The term "about" used throughout this specification is used to describe and account for small fluctuations. For example, the term "about" can refer to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

"AMOx" refers to a selective ammonia oxidation catalyst, which is a catalyst containing one or more metals (typically Pt, although not limited thereto) and an SCR catalyst suitable to convert ammonia to nitrogen.

The terms "catalyst" or "catalyst material" or "catalyst composition" or "catalytic material" refer to materials that promote a reaction. To produce catalytic articles, a substrate as disclosed herein below is coated with a catalyst composition. The coatings are "catalytic coating compositions" or "catalytic coatings." The terms "catalyst composition" and "catalytic coating composition" are synonymous.

"CSF" refers to a catalyzed soot filter, which is a wall-flow monolith. A wall-flow filter consists of alternating inlet channels and outlet channels, where the inlet channels are plugged on the outlet end and the outlet channels are plugged on the inlet end. A soot-carrying exhaust gas stream entering the inlet channels is forced to pass through the filter walls before exiting from the outlet channels. In addition to soot filtration and regeneration, A CSF may carry oxidation catalysts to oxidize CO and HC to $CO_2$ and $H_2O$, or oxidize NO to $NO_2$ to accelerate the downstream SCR catalysis or to facilitate the oxidation of soot particles at lower temperatures. A CSF, when positioned behind a LNT catalyst, can have a $H_2S$ oxidation functionality to suppress $H_2S$ emission during the LNT desulfation process.

"DOC" refers to a diesel oxidation catalyst, which converts hydrocarbons and carbon monoxide in the exhaust gas of a diesel engine. Typically, a DOC comprises one or more platinum group metals such as palladium and/or platinum; a support material such as alumina; zeolites for HC storage; and optionally promoters and/or stabilizers.

"LNT" refers to a lean $NO_x$ trap, which is a catalyst containing a platinum group metal, ceria, and an alkaline earth trap material suitable to adsorb $NO_x$ during lean conditions (for example, BaO or MgO). Under rich conditions, $NO_x$ is released and reduced to nitrogen.

The term "$NO_x$" refers to nitrogen oxide compounds, such as NO or $NO_2$.

The terms "on" and "over" in reference to a coating layer may be used synonymously. The term "directly on" means in direct contact with. The disclosed articles are referred to in certain embodiments as comprising one coating layer "on" a second coating layer, and such language is intended to encompass embodiments with intervening layers, where direct contact between the coating layers is not required (i.e., "on" is not equated with "directly on").

As used herein, the term "selective catalytic reduction" (SCR) refers to the catalytic process of reducing oxides of nitrogen to dinitrogen ($N_2$) using a nitrogenous reductant. As used herein, the terms "nitrogen oxides" or "$NO_x$" designate the oxides of nitrogen.

"SCRoF" refers to an SCR catalyst composition coated directly onto a wall-flow filter.

As used herein, the term "structure-directing agent" is a compound that is present during crystallization of the zeolite and helps guide the formation of the desired crystal structure (e.g., CHA).

As used herein, the term "substrate" refers to the monolithic material onto which the catalyst composition, that is, catalytic coating, is disposed, typically in the form of a washcoat. In one or more embodiments, the substrates are flow-through monoliths and monolithic wall-flow filters. A washcoat is formed by preparing a slurry containing a specified solids content (e.g., 30-90% by weight) of catalyst in a liquid, which is then coated onto a substrate and dried to provide a washcoat layer. Reference to "monolithic substrate" means a unitary structure that is homogeneous and continuous from inlet to outlet.

"Washcoat" has its usual meaning in the art of a thin, adherent coating of a material (e.g., a catalyst) applied to a "substrate", such as a honeycomb flow-through monolith substrate or a filter substrate which is sufficiently porous to permit the passage therethrough of the gas stream being treated. As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can be different in some way (e.g., may differ in physical properties thereof such as, for example particle size or crystallite phase) and/or may differ in the chemical catalytic functions.

"Molecular sieves" are framework materials that may be used, e.g., in particulate form, in combination with one or more promoter metals, as catalysts. Molecular sieves are materials based on an extensive three-dimensional network of oxygen ions containing generally tetrahedral type sites and having a substantially uniform pore distribution, with the average pore size being no larger than 20 Angstroms (Å). The pore sizes are defined by the ring size.

As used herein, the term "zeolite" refers to a specific example of a molecular sieve, including silicon and aluminum atoms. Zeolites are crystalline materials having rather uniform pore sizes which, depending upon the type of zeolite and the type and amount of cations included in the zeolite lattice, range from about 3 to 10 Å in diameter. Zeolites are understood to be aluminosilicates with open 3-dimensional framework structures composed of corner-sharing $TO_4$ tetrahedra, where T is Al or Si. Cations that balance the charge of the anionic framework are loosely associated with the framework oxygens, and the remaining pore volume is filled with water molecules. The non-framework cations are generally exchangeable, and the water molecules removable.

In specific embodiments, reference may be made to an "aluminosilicate zeolite" framework type, which limits the material to zeolites that do not include phosphorus or other metals substituted in the framework, while the broader term "zeolite" is intended to include aluminosilicates and aluminophosphates. In some embodiments, the zeolite is an aluminosilicate zeolite. The term "aluminophosphates" refers to another specific example of a zeolite, including aluminum and phosphate atoms. In some embodiments, the zeolite is a silicoaluminophosphate. Silicoaluminophosphate zeolites comprise $SiO_4/AlO_4/PO_4$ tetrahedra, and are referred to as "SAPOs." Non-limiting examples of SAPOs include SAPO-34 and SAPO-44.

Zeolites generally comprise silica-to-alumina (SAR) molar ratios of 2 or greater. Zeolites for use in the disclosed catalyst compositions are not particularly limited in terms of SAR values, although the particular SAR value associated with a zeolite may, in some embodiments, affect the SCR performance of the catalyst composition into which it is incorporated (e.g., particularly after aging). In some embodiments, the SAR values of the zeolites are in the range of from about 5 to about 100, or from about 5 to about 50. In some embodiments, the SAR is from about 5 to about 25 and, in other embodiments, the SAR is from about 10 to about 15.

Zeolites can be classified by means of the framework topology by which the structures are identified. In some embodiments, the present disclosure relates to zeolites having the chabazite (CHA) framework. Zeolitic CHA-framework type zeolites have the approximate formula: $(Ca, Na_2, K_2, Mg)Al_2Si_4O_{12} \cdot 6H_2O$ (e.g., hydrated calcium aluminum silicates). Three synthetic forms of zeolitic CHA-framework type molecular sieves are described in "Zeolite Molecular Sieves," by D. W. Breck, published in 1973 by John Wiley & Sons, which is hereby incorporated by reference. The three synthetic forms reported by Breck are Zeolite K-G, described in J. Chem. Soc., p. 2822 (1956), Barrer et al; Zeolite D, described in British Patent No. 868,846 (1961); and Zeolite R, described in U.S. Pat. No. 3,030,181, which are hereby incorporated by reference. Synthesis of another synthetic form of zeolitic CHA framework type, SSZ-13, is described in U.S. Pat. No. 4,544,538, which is hereby incorporated by reference. In particular embodiments, CHA framework zeolites are selected from the group consisting of SSZ-13, SSZ-62, natural chabazite, zeolite K-G, Linde D, Linde R, LZ-218, LZ-235, LZ-236, ZK-14, SAPO-34, SAPO-44, SAPO-47, and ZYT-6.

Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework, CHA frameworks have a "double 6-ring" (d6r) secondary building unit. A d6r secondary building unit has twelve tetrahedral atoms, and is created by joining two "single s6r units" where the "6" denotes the positions of tetrahedral silicon and aluminum atoms, and the oxygen atoms are located between tetrahedral atoms).

In some embodiments, present zeolites are small pore zeolites. As used herein, the term "small pore" refers to pore openings which are smaller than about 5 Å, for example on the order of ~3.8 Å. Pore sizes are defined by the largest ring size. A small pore zeolite contains channels defined by up to eight tetrahedral atoms. The phrase "8-ring" zeolite refers to a zeolite having 8-ring pore openings and double-six ring (d6r) secondary building units and having a cage like structure resulting from the connection of double six-ring building units by 4 rings. Exemplary small pore zeolites include framework types ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON and mixtures or intergrowths thereof.

In some cases, the pores of these zeolites open into larger cavities that are referred to herein as "cages." Without wishing to be bound by theory, these cages are thought to be catalytically relevant in a number of systems, as they could provide a localized volume within which the reacting molecules, and in some cases the catalytic atom, can interact. To provide more quantitative information about the size of cages in comparison to the pore system present in the zeolite, the International Zeolite Association-Structure Commission (IZA-SC) database (accessible at, for example, http://www.iza-structure.org/databases; incorporated herein by reference) provides the following information—(i) the diameter of the largest possible included sphere; and (ii) the diameter of the largest-free-sphere that can diffuse along the three crystallographic directions a, b and c. By comparing the value of the diameter of the largest possible included sphere against the diameters of the largest free spheres that can diffuse within the framework, information may be obtained regarding the size of the zeolite cage in comparison to the size of the zeolite pores. However, since the cages are often not symmetric in all directions, these numbers cannot always provide a full description of the cages present in the zeolite structure. For example, the AFX framework has 'aft' cages as a CBU, while the CHA framework has 'cha' cages as a CBU. Both framework structures have 8-ring pore openings and the diameter of the largest sphere that can be included is very similar (7.76 Å for AFX versus 7.37 Å for CHA). However, the structures of the two cages are very different in practice. Nevertheless, reference to the diameter of the largest possible included sphere provides a way to distinguish cage-containing zeolite structures from those that contain only channels.

Unless otherwise indicated, all parts and percentages are by weight. "Weight percent (wt %)," if not otherwise indicated, is based on an entire composition free of any volatiles, that is, based on dry solids content.

All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

All U.S. patent applications, published patent applications, and patents referred to herein are hereby incorporated by reference.

Small Pore Zeolite Synthesis Method

As a non-limiting example description, the zeolitic materials disclosed herein are prepared from a reaction mixture (synthesis gel) containing a source of a first organic structure-directing agent, a source of a second organic structure-directing agent, a source of silicon, a source of aluminum, and water. Accordingly, in one aspect is provided a method of synthesizing a small pore zeolite, the method comprising mixing water, an aluminum source, a silica source, a source of a first organic structure-directing agent (OSDA), and a source of a second OSDA to form a synthesis gel, wherein the first OSDA is bis-quaternary ammonium cations, and the second OSDA is mono-quaternary ammonium cations; and subjecting the synthesis gel to a crystallization process to crystallize the small pore zeolite. Each component is described more fully herein below.

Organic Structure Directing Agents

To prepare a small pore zeolite according to the disclosed methods, OSDAs, also referred to herein as "templates" or "templating agents" are used. OSDAs are organic (i.e., carbon-containing) molecules which guide or direct the molecular shape and pattern of the framework of the zeolite, e.g., serving as a scaffold around which the zeolite crystals form. After the crystals are formed, the OSDA is removed from the interior structure of the crystals (e.g., by calcination), leaving a molecularly porous aluminosilicate cage. The specific types of OSDAs used can vary. Typically, OSDAs are selected from cyclic amines and/or ammonium compounds, for example quaternary ammonium cations with various substituents. Suitable OSDAs are disclosed in, for example, Zeolites and Related Microporous Materials: State of the Art 1994, Studies of Surface Science and Catalysis, Vol. 84, p 29-36; *Novel Materials in Heterogeneous Catalysis* (ed. Baker and Murrell), Chapter 2, p 14-24, May 1990; J. Am, Chem, Soc., 2000, 122, p 263-273; and U.S. Pat. Nos. 4,544,538 and 6,709,644, each of which are incorporated herein by reference.

Specifically, the methods provided herein utilize two different OSDAs, a first OSDA which is bis-quaternary ammonium cations, and a second OSDA, which is mono-quaternary ammonium cations. As used herein, the term "quaternary ammonium cation" refers to an organic molecule containing a nitrogen atom which bears four substituents, and therefore has a positive (cationic) charge. The quaternary ammonium cations are balanced with anions, for example halide (e.g., Cl$^-$, Br$^-$, I$^-$), hydrogen sulfate (HSO$_4^-$), or hydroxide (OH$^-$) ions, referred to herein as a "quaternary ammonium salt" or a "quaternary ammonium compound", which dissociate in solution to the free quaternary ammonium cations and respective anions. As used herein, the term "source" with respect to OSDAs refers to a quaternary ammonium compound (e.g., a salt) which, under zeolite synthesis conditions, dissociates to provide the quaternary ammonium cationic species active as the structure directing agent.

As used herein, the term "mono-quaternary ammonium" refers to molecules containing one quaternary ammonium cation as described herein. As used herein, the term "bis-quaternary ammonium" refers to molecules containing two such quaternary ammonium cations as described herein.

First OSDA

In some embodiments, the first OSDA is bis-quaternary ammonium cations. In some embodiments, the bis-quaternary ammonium cations comprises from about 8 to about 20 carbon atoms, for example, from about 8, 9, 10, 11, 12, 13, 14, or 15 carbon atoms, to about 16, 17 18, 19, or 20 carbon atoms. Bis-quaternary ammonium cations may comprise various structural arrangements, for example, acyclic or cyclic structures. In some embodiments, the bis-quaternary ammonium cations are acyclic, meaning no ring system is present. Non-limiting examples of acyclic bis-quaternary ammonium cations include N1,N1,N1,N3,N3,N3-hexaethylpropane-1,3-diaminium and N1,N1,N1,N8,N8,N8-hexamethyloctane-1,8-diaminium. In some embodiments, the bis-quaternary ammonium cations are cyclic, meaning the quaternary ammonium groups are attached to or, together with two or more of their substituents, form one or more ring systems. Non-limiting examples of cyclic bis-quaternary ammonium cations include N1,N1,N1,N4,N4,N4-hexamethylcyclohexane-1,4-diaminium, 1,1,4,4-tetramethylpiperazine-1,4-diium, and N1,N1,N1,N4,N4,N4-hexamethylbicyclo[2.2.2]octane-1,4-diaminium.

In some embodiments, each nitrogen atom of the bis-quaternary ammonium cations bears four substituents, wherein each substituent is independently selected from the group consisting of alkyl, cycloalkyl, alkenyl, aryl, arylalkyl, and combinations thereof.

In some embodiments, the bis-quaternary ammonium cations have a structure represented by Formula I.

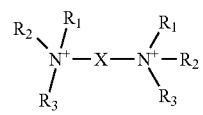

(I)

wherein:

each of substituents R$_1$, R$_2$, and R$_3$ are methyl or ethyl; or optionally, both R$_3$ groups may be joined to form a —(CH$_2$)$_n$— bridge, where n is an integer from 1 to 3; and X is selected from the group consisting of alkyl, cycloalkyl, alkenyl, aryl, arylalkyl, and combinations thereof.

In some embodiments, X is an alkyl group. As used herein, the term "alkyl" refers to a straight- or branched-chain saturated hydrocarbon having from 2 to 8 carbon atoms. Representative C$_2$-C$_8$ alkyl groups include, but are not limited to, -ethyl, -n-propyl, -n-butyl, -n-pentyl, and -n-hexyl, while branched C$_2$-C$_8$ alkyls include, but are not limited to, -isopropyl, -sec-butyl, -isobutyl, -tert-butyl, -isopentyl, and 2-methylbutyl.

In some embodiments, X is an alkenyl group. As used herein, the term "alkenyl" refers to a C$_2$-C$_8$ hydrocarbon containing normal, secondary, or tertiary carbon atoms with at least one site of unsaturation, i.e., a carbon-carbon, $sp^2$ double bond. Examples include, but are not limited to: ethylene or vinyl, -allyl, -1-butenyl, -2-butenyl, -isobutylenyl, -1-pentenyl, -2-pentenyl, -3-methyl-1-butenyl, -2-methyl-2-butenyl, -2,3-dimethyl-2-butenyl, and the like.

In some embodiments, X is a cycloalkyl group. "Cycloalkyl" as used herein refers to a saturated carbocyclic radical, which may be mono- or bicyclic, and which include a ring system having 4 to 8 carbon atoms. Examples of monocyclic cycloalkyl groups include cyclopropyl, cyclobutyl, cyclopentyl, cyclohexyl, cycloheptyl, and cyclooctyl.

In some embodiments, X is an aryl group. "Aryl" as used herein refers to a $C_6$-$C_{20}$, carbocyclic aromatic group. Examples of aryl groups include, but are not limited to, phenyl and naphthyl.

In some embodiments, X is an arylalkyl group. "Alylalkyl" as used herein refers to an acyclic alkyl radical in which one of the hydrogen atoms bonded to a carbon atom, typically a terminal or $sp^3$ carbon atom, is replaced with an aryl radical. Typical arylalkyl groups include, but are not limited to, benzyl, dibenzyl, 2-phenylethan-1-yl, naphthylmethyl, 2-naphthylethan-1-yl, naphthobenzyl, 2-naphthophenylethan-1-yl, and the like. The arylalkyl group comprises 6 to 20 carbon atoms, e.g. the alkyl moiety of the arylalkyl group is 1 to 6 carbon atoms and the aryl moiety is 5 to 14 carbon atoms.

It is to be understood that the above radical naming convention refers to di-radicals. For example, a substituent identified as "alkyl" will require two points of attachment, and therefore includes di-radicals such as —$CH_2CH_2$—, —$CH_2CH(CH_2)CH_2$—, and the like. This radical naming convention clearly indicates that any alkyl, alkenyl, cycloalkyl, aryl, and arylalkyl radical is a di-radical (i.e., alkylene, alkenylene, cycloalkylene, arylene, and arylalkylene, respectively). It is to be understood that a di-radical substituent can be attached in any directional configuration unless otherwise indicated.

Non-limiting examples of bis-quaternary ammonium cations according to Formula I include those structures represented in Table 1.

TABLE 1

Non-Limiting Examples of Bis-Quaternary Ammonium Cations According to Formula I.

| Name | X | $R_1$ | $R_2$ | $R_3$ | Structure |
|---|---|---|---|---|---|
| N1,N1,N1,N3,N3,N3-hexaethylpropane-1,3-diaminium | —$(CH_2)_3$— | $CH_3$ | $CH_3$ | $CH_3$ | |
| N1,N1,N1,N4,N4,N4-hexamethylbutane-1,4-diaminium | —$(CH_2)_4$— | $CH_3$ | $CH_3$ | $CH_3$ | |
| N1,N1,N1,N4,N4,N4-hexaethylbutane-1,4-diaminium | —$(CH_2)_4$— | $CH_3CH_2$ | $CH_3CH_2$ | $CH_3CH_2$ | |
| (E)-N1,N1,N1,N4,N4,N4-hexamethylbut-2-ene-1,4-diaminium | —$CH_2$—$(CH_2)_2$—$CH_2$— | $CH_3$ | $CH_3$ | $CH_3$ | |
| N1,N1,N1,N5,N5,N5-hexamethylpentane-1,5-diaminium | —$(CH_2)_5$— | $CH_3$ | $CH_3$ | $CH_3$ | |
| (E)-N1,N1,N1,N5,N5,N5-hexamethylpent-2-ene-1,5-diaminium | —$CH_2$—$(CH)_2$—$(CH_2)_2$— | $CH_3$ | $CH_3$ | $CH_3$ | |
| N1,N1,N1,N6,N6,N6-hexamethylhexane-1,6-diaminium | —$(CH_2)_6$— | $CH_3$ | $CH_3$ | $CH_3$ | |

TABLE 1-continued

Non-Limiting Examples of Bis-Quaternary Ammonium Cations According to Formula I.

| Name | X | R₁ | R₂ | R₃ | Structure |
|---|---|---|---|---|---|
| (E)-N1,N1,N1,N6,N6,N6-hexamethylhex-2-ene-1,6-diaminium | —CH₂—(CH)₂—(CH₂)₃— | CH₃ | CH₃ | CH₃ | |
| (2E,4E)-N1,N1,N1,N6,N6,N6-hexamethylhexa-2,4-diene-1,6-diaminium | —CH₂—(CH)₄—CH₂— | CH₃ | CH₃ | CH₃ | |
| N1,N1,N1,N7,N7,N7-hexamethylheptane-1,7-diaminium | —(CH₂)₇— | CH₃ | CH₃ | CH₃ | |
| N1,N1,N1,N8,N8,N8-hexamethyloctane-1,8-diaminium | —(CH₂)₈— | CH₃ | CH₃ | CH₃ | |
| N1,N1,N1,N3,N3,N3-hexamethylcyclohexane-1,3-diaminium | 1,3-cyclohexyl | CH₃ | CH₃ | CH₃ | |
| N1,N1,N1,N3,N3,N3-hexamethylbicyclo[2.2.1]heptane-1,3-diaminum | 1,3-bicyclo[2.2.1]heptane | CH₃ | CH₃ | CH₃ | |
| N1,N1,N1,N3,N3,N3-hexamethylbenzene-1,3-diaminium | 1,3-phenyl | CH₃ | CH₃ | CH₃ | |
| N1,N1,N1,N4,N4,N4-hexamethylcyclohexane-1,4-diaminium | 1,4-cyclohexyl | CH₃ | CH₃ | CH₃ | |

TABLE 1-continued

Non-Limiting Examples of Bis-Quaternary Ammonium Cations According to Formula I.

| Name | X | R$_1$ | R$_2$ | R$_3$ | Structure |
|---|---|---|---|---|---|
| N1,N1,N1,N4,N4,N4-hexamethylbicyclo[2.2.1]heptane-1,4-diaminium | 1,4-bicyclo[2.2.1]heptane | CH$_3$ | CH$_3$ | CH$_3$ | |
| N1,N1,N1,N4,N4,N4-hexamethylbicyclo[2.2.2]octane-1,4-diaminium | 1,4-bicyclo[2.2.2]octane | CH$_3$ | CH$_3$ | CH$_3$ | |
| N1,N1,N1,N4,N4,N4-hexamethylbenzene-1,4-diaminium | 1,4-phenyl | CH$_3$ | CH$_3$ | CH$_3$ | |
| 1,1,4,4-tetramethylpiperazine-1,4-dium | —(CH$_2$)$_2$— | CH$_3$ | CH$_3$ | —(CH$_2$)$_2$— | |
| 1,1,3,3-tetramethylhexahydro-pyrimidine-1,3-dium | —(CH$_2$)$_3$— | CH$_3$ | CH$_3$ | —(CH$_2$)$_2$— | |
| 1,1'-(1,3-phenylene)bis(N,N,N-trimethylmethanaminium) | 1,3-dibenzyl | CH$_3$ | CH$_3$ | CH$_3$ | |

TABLE 1-continued

Non-Limiting Examples of Bis-Quaternary Ammonium Cations According to Formula I.

| Name | X | $R_1$ | $R_2$ | $R_3$ | Structure |
|---|---|---|---|---|---|
| 1,1'-(1,4-phenylene)bis(N,N,N-trimethylmethanaminium) | 1,4-dibenzyl | $CH_3$ | $CH_3$ | $CH_3$ | |

In some embodiments, the bis-quaternary ammonium cations have a structure as represented in Table 1.

In some embodiments, the bis-quaternary ammonium cations have a structure selected from the group consisting of N1,N1,N1,N3,N3,N3-hexaethylpropane-1,3-diaminium, N1,N1,N1,N4,N4,N4-hexamethylbutane-1,4-diaminium, N1,N1,N1,N4,N4,N4-hexaethylbutane-1,4-diaminium, (E)-N1,N1,N1,N4,N4,N4-hexamethylbut-2-ene-1,4-diaminium, N1,N1,N1,N5,N5,N5-hexamethylpentane-1,5-diaminium, (E)-N1,N1,N1,N5,N5,N5-hexamethylpent-2-ene-1,5-diaminium, N1,N1,N1,N6,N6,N6-hexamethylhexane-1,6-diaminium, (E)-N1,N1,N1,N6,N6,N6-hexamethylhex-2-ene-1,6-diaminium, (2E,4E)-N1,N1,N1,N6,N6,N6-hexamethylhexa-2,4-diene-1,6-diaminium, N1,N1,N1,N7,N7,N7-hexamethylheptane-1,7-diaminium, N1,N1,N1,N8,N3,N8-hexamethyloctane-1,8-diaminium, N1,N1,N1,N3,N3,N3-hexamethylcyclohexane-1,3-diaminium, N1,N1,N1,N3,N3,N3-hexamethylbicyclo[2.2.1]heptane-1,3-diaminium, N1,N1,N1,N3,N3,N3-hexamethylbenzene-1,3-diaminium, N1,N1,N1,N4,N4,N4-hexamethylcyclohexane-1,4-diaminium, N1,N1,N1,N4,N4,N4-hexamethylbicyclo[2.2.1]heptane-1,4-diaminium, N1,N1,N1,N4,N4,N4-hexamethylbicyclo[2.2.2]octane-1,4-diaminium, N1,N1,N1,N4,N4,N4-hexamethylbenzene-1,4-diaminium, 1,1,4,4-tetramethylpiperazine-1,4-diium, 1,1,3,3-tetramethylhexahydropyrimidine-1,3-diium, 1,1'-(1,3-phenylene)bis(N,N,N-trimethylmethanaminium), 1,1'-(1,4-phenylene)bis(N,N,N-trimethylmethanaminium), and combinations thereof.

In some embodiments, the source of the first OSDA (i.e., bis-quaternary ammonium cations) is a bis-quaternary ammonium compound comprising bis-quaternary ammonium cations as described herein above, and balancing anions. In some embodiments, the balancing anions are selected from the group consisting of OH, Cl, and Br. In some embodiments, the source of the first organic structure-directing agent is N1,N1,N1,N6,N6,N6-hexamethylhexane-1,6-diaminium dihydroxide (hexamethonium dihydroxide; HMOH) or N1,N1,N1,N8,N8,N8-hexamethyloctane-1,8-diaminium dihydroxide (octamethonium dihydroxide; OMOH).

In some embodiments, the first OSDA comprises a derivative of the bis-quaternary ammonium cation. A derivative of the bis-quaternary ammonium cation comprises a compound that arises or is made from the bis-quaternary ammonium cation by replacement one atom with another atom or group of atoms, or by elimination of an atom or a group of atoms, or by conversion of a single into a double or triple bond, or by conversion of a double or triple bond into a single bond. Derivative of the bis-quaternary ammonium cation can be intentionally added to the zeolite synthesis mixture, or can be produced during the synthesis reaction.

Second OSDA

In some embodiments, the second OSDA is mono-quaternary ammonium cations. In some embodiments, the mono-quaternary ammonium cations comprise from about 4 to about 14 carbon atoms, for example, from 4, 5, 6, 7, 8, 9, or 10 carbon atoms, to 11, 12, 13, or 14 carbon atoms. Mono-quaternary ammonium cations may comprise various structural arrangements, for example, acyclic or cyclic structures. In some embodiments, the mono-quaternary ammonium cations are acyclic. Non-limiting examples of acyclic mono-quaternary ammonium cations include tetramethylammonium and tetraethylammonium. In some embodiments, the mono-quaternary ammonium cations are cyclic. Non-limiting examples of cyclic mono-quaternary ammonium cations include N,N,N-trimethyladamantan-1-aminium and 1,1-dimethylpiperidin-1-ium.

In some embodiments, the nitrogen atom of the mono-quaternary ammonium cations bears four substituents, wherein each substituent is independently selected from the group consisting of alkyl, cycloalkyl, alkenyl, aryl, arylalkyl, and combinations thereof, each as defined above.

In some embodiments, the mono-quaternary ammonium cations have a structure represented by Formula II:

(II)

wherein:

$R_1$, $R_2$, and $R_3$ are each methyl or ethyl; and $R_4$ is selected from the group consisting of methyl, ethyl, hydroxyethyl, benzyl, cyclohexyl, azabicycloheptyl, adamantyl, and phenyl;

or optionally, $R_3$ and $R_4$ together with the attached nitrogen, or $R_2$, $R_3$, and $R_4$ together with the attached nitrogen, may be joined to form a mono- or bicylic ring system, which may optionally be substituted with one or more methyl or OH groups.

In some embodiments, $R_3$ and $R_4$, together with the attached nitrogen form a piperidine ring (i.e., $R_3$ and $R_4$ together are —(CH$_2$)$_5$—). In some embodiments, the piperidine ring is substituted with one or more methyl groups. In some embodiments, the piperidine ring is substituted with a methyl group at the 3-position and the 5-position.

In some embodiments, $R_2$, $R_3$, and $R_4$, together with the attached nitrogen, form an azabicyclooctane ring. In some embodiments, the azabicyclooctane ring is substituted with a hydroxyl group. In some embodiments, the azabicyclooctane ring is substituted with a hydroxyl group at the 3-position.

Non-limiting examples of mono-quaternary ammonium cations having a structure according to Formula II include those represented in Table 2.

TABLE 2

Non-Limiting Examples of Mono-Quaternary Ammonium Cations According to Formula II.

| Name | $R_1$ | $R_2$ | $R_3$ | $R_4$ | Structure |
|---|---|---|---|---|---|
| tetraethylammonium | CH$_3$CH$_2$ | CH$_3$CH$_2$ | CH$_3$CH$_2$ | CH$_3$CH$_2$ | 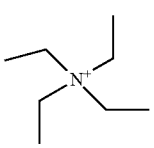 |
| 2-hydroxy-N,N,N-trimethylethan-1-aminium | CH$_3$ | CH$_3$ | CH$_3$ | CH$_2$CH$_2$OH | 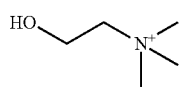 |
| N,N,N-trimethylcyclohexanaminium | CH$_3$ | CH$_3$ | CH$_3$ | cyclohexyl | 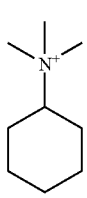 |
| N,N,N-trimethyladamantan-1-aminium | CH$_3$ | CH$_3$ | CH$_3$ | adamantyl | 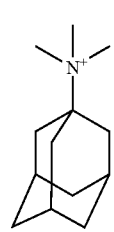 |
| N,N,N-trimethylbicyclo[2.2.1]heptan-2-aminium | CH$_3$ | CH$_3$ | CH$_3$ | Azabicyclo (2.2.1) heptyl | 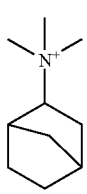 |
| N,N,N-trimethylbenzenaminium | CH$_3$ | CH$_3$ | CH$_3$ | phenyl | 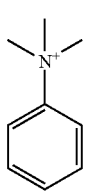 |
| 1,1-dimethylpiperidin-1-ium | CH$_3$ | CH$_3$ | —(CH$_2$)$_5$— | | 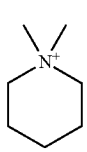 |

TABLE 2-continued

Non-Limiting Examples of Mono-Quaternary Ammonium Cations According to Formula II.

| Name | R₁ | R₂ | R₃ | R₄ | Structure |
|---|---|---|---|---|---|
| 1,1,3,5-tetramethylpiperidin-1-ium | CH₃ | CH₃ | —CH₂—CH₂(CH₃)CH₂CH₂(CH₃)CH₂— | | 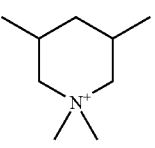 |
| 1-methylquinuclidin-1-ium | CH₃ | | Azabicyclo[2.2.2]octyl | | 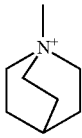 |
| 3-hydroxy-1-methylquinuclidin-1-ium | CH₃ | | 3-hydroxy-Azabicyclo[2.2.2]octyl | | 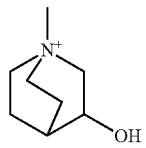 |

In some embodiments, the bis-quaternary ammonium cations have a structure as represented in Table 2.

In some embodiments, the mono-quaternary ammonium cations are selected from the group consisting of tetraethylammonium, 2-hydroxy-N,N,N-trimethylethan-1-aminium, N,N,N-trimethylcyciohexanaminium, N,N,N-trimethyladamantan-1-aminium (TMAda), N,N,N-trimethylbicyclo[2.2.1]heptan-2-aminium, N,N,N-trimethylbenzenaminium, 1,1-dimethylpiperidin-1-ium, 1,1,3,5-tetramethylpiperidin-1-ium, i-methylquinuclidin-1-ium, 3-hydroxy-1-methylquinuclidin-1-ium, and combinations thereof. In some embodiments, the second organic structure-directing agent is N,N,N-trimethyladamantan-1-aminium (TMAda).

In some embodiments, the source of the second OSDA (i.e., mono-quaternary ammonium cations) is a mono-quaternary ammonium compound comprising mono-quaternary ammonium cations as described herein above, and balancing anions. In some embodiments, the balancing anions are selected from the group consisting of OH, Cl, and Br. In some embodiments, the source of the second organic structure-directing agent is TMAdaOH.

In some embodiments, the source of the first organic structure-directing agent is HMOH or OMOH, and the source of the second organic structure-directing agent is TMAdaOH.

While HMOH alone has previously been shown to direct the synthesis of EUO and *MRE framework zeolites, it has not been used previously for the synthesis of CHA framework zeolites. Surprisingly, according to the present disclosure, it has been found that the use of HMOH or OMOH, in the presence of TMAdaOH, results in the crystallization of pure CHA phase zeolites.

The quantity of the first and second OSDAs present in the synthesis gel may vary. In some embodiments, the quantity of each of the first and second OSDAs present may be expressed by a molar ratio with respect to silicon. In some embodiments, the molar ratio of the first OSDA to silicon is from about 0.01 to about 0.2, for example, from about 0.01, about 0.02, about 0.03, about 0.04, about 0.05, about 0.06, about 0.07, about 0.08, about 0.09, or about 0.1, to about OA 1, about 0.12, about 0.13, about 0.14, about 0.15, about 0.16, about 0.17, about 0.18, about 0.19, or about 0.2. In some embodiments, the molar ratio of the second OSDA to silicon is from about 0.02 to about 0.1, for example, from about 0.02, about 0.03, about 0.04, or about 0.05, to about 006, about 0.07, about 0.08, about 0.09, or about 0.1.

The ratio of the first organic structure-directing agent to the second organic structure-directing agent may vary. In some embodiments, the molar ratio of the first organic structure-directing agent to the second organic structure-directing agent is in the range of from about 0.001 to about 1000, for example, from about 0.001, about 0.01, about 0.1, about 0.5, or about 1, to about 10, about 20, about 50, about 100, about 500, or about 1000. In some embodiments, the molar ratio of the first organic structure-directing agent to the second organic structure-directing agent is from about 0.1 to about 10. In some embodiments, the molar ratio of the first organic structure-directing agent to the second organic structure-directing agent is from about 0.5 to about 2.0.

In some embodiments, the second OSDA comprises a derivative of the mono-quaternary ammonium cation. A derivative of the mono-quaternary ammonium cation comprises a compound that arises or is made from the mono-quaternary ammonium cation by replacement of one atom with another atom or group of atoms, or by elimination of an atom or a group of atoms, or by conversion of a single into a double or triple bond, or by conversion of a double or triple bond into single bond. Derivative of the mono-quaternary ammonium cation can be intentionally added to the zeolite synthesis mixture, or can be produced during the synthesis reaction.

Inorganic Structure Directing Agent

In some embodiments, the synthesis gel further comprises an inorganic structure directing agent (SDA). When present, the inorganic SDA can vary and, in some embodiments, may be alkali metal or alkaline earth metal cations. In some embodiments, the inorganic SDA is an alkali metal cation such as lithium, sodium, potassium, or cesium. In certain embodiments, the inorganic SDA is sodium or potassium cations. The source of the inorganic SDA (e.g., alkali metal cations) may vary. For example, alkali metal cations such as Li⁺, K⁺ or Cs⁺ may be added in the hydroxide form or as another suitable salt (e.g., sulfate, chloride, nitrate, etc.). In specific embodiments, the source of sodium or potassium cations is sodium or potassium hydroxide, respectively, for example, an aqueous solution of sodium hydroxide (NaOH) or potassium oxide ($K_2O$). In some embodiments, the source of sodium or potassium cations is sodium or potassium sulfate.

The quantity of inorganic structure directing agent present can vary. Notably, hydroxide ions are the only necessary mineralizing agent needed in the reaction mixture, and the amount of hydroxide needed in the synthesis gel can be provided from the organic structure directing agent source. In some embodiments, an alkali metal hydroxide serves as the inorganic SDA and the hydroxide ion source, and is provided in a quantity so as to ensure that the synthesis gel has a pH within a particular range. For example, in some embodiments, the pH is advantageously basic, e.g., about 12 to about 13.

Aluminum Source

The aluminum source may vary. In some embodiments, the aluminum source is non-zeolitic. In some embodiments, the aluminum source is non-crystalline. For example, in certain embodiments, the aluminum source may be a non-crystalline source selected from an aluminum salt (e.g., aluminum triisopropoxide or other alkoxides, aluminum hydroxides, aluminum nitrate, aluminum chloride, aluminum phosphate), aluminum metal, a non-crystalline aluminum oxide, or a non-crystalline aluminosilicate. In other embodiments, the source of aluminum is crystalline, such as a crystalline alumina or a zeolite.

In some embodiments, the aluminum source comprises a zeolite. The zeolite used as the aluminum source can vary, and will include various zeolite materials known in the art, particularly various aluminosilicate zeolites. In some embodiments, the source of aluminum comprises a zeolite having the FAU, LTA, LTL, MFI, or BEA crystalline framework. In some embodiments, the source of aluminum is zeolite Y in the $Na^+$ form.

Silicon Source

The silicon source may vary as well. In various embodiments, the silicon is provided by one or more of precipitated silica, colloidal silica, silica gels, silicon hydroxides, silicon alkoxides, amorphous silica, aluminosilicate, fumed silica, or silicates, such as alkali silicates. In some embodiments, the silicon source is colloidal silica. In some embodiments, the silicon source is an alkali metal silicate. In some embodiments, the silicon source is sodium silicate.

In some embodiments, the amounts of the silicon and the aluminum present in the synthesis gel are chosen in a way that the calculated SAR of the starting composition ranges between about 1 and about 100, for example, from about 2 to 60. In some embodiments, the SAR of the starting composition ranges from about 10 to about 35. In some embodiments, the SAR of the starting composition ranges from about 20 to about 30. The skilled person knows that the SAR in the synthesis and the SAR in the final zeolite are not necessarily identical, and will also know how to choose SAR values in the synthesis in order to obtain a desired SAR in the final zeolite.

In some embodiments, the OH/Si ratio of the synthesis gel is from about 0.03 to about 1.0, for example, from about 0.03, about 0.04, about 0.05, about 0.06, about 0.07, about 0.08, about 0.09, or about 0.1, to about 0.2, about 0.3, about 0.4, about 0.5, about 0.6, about 0.7, about 0.8, about 0.9, or about 1.0.

Mixing

As described herein above, the method generally comprises forming a reaction mixture comprising water, an aluminum source, a silicon source, a source of a first organic structure-directing agent (OSDA), and a source of a second OSDA to form a synthesis gel; and subjecting the synthesis gel to a crystallization process to crystallize the zeolite.

In some embodiments, the method comprises mixing the reaction mixture comprising the water, the aluminum source, the silicon source, the source of a first organic structure-directing agent (OSDA), and the source of the second OSDA to form an aluminosilicate-containing solution, referred to herein as a "synthesis gel" or "gel"). Generally, the synthesis gel has a high solids content (e.g., about 15% or greater or about 20% or greater).

The mixing step can be done at varying temperatures; in some embodiments, the mixing is done at room temperature. In some embodiments, the mixing is conducted at an elevated temperature (e.g., greater than room temperature, such as from about 25° C. to about 100° C.).

The mixing step can be performed for varying periods of time. The time period for mixing can be in the range of from 1 second to about 24 hours. For example, the time period can be from about 1 second to about 1 minute; or from about 1 minute, about 5 minutes, about 10 minutes, or about 15 minutes, to about 30 minutes, about 45 minutes, or about 1 hour; or from about 1 hour, about 2 hours, about 3 hours, about 4 hours, about 5 hours, or about 6 hours, to about 12 hours, or about 24 hours. In some embodiments, the time period is about 2 hours.

In some embodiments, the mixing can be performed in separate; discrete steps. Accordingly, in some embodiments, the method comprises a first mixing step comprising adding the source of the first OSDA, the source of the second OSDA, and the source of aluminum to the water to form an aluminum-containing aqueous solution and mixing the aqueous solution for a first time period.

The first time period can be in the range of 1 second to about 24 hours. For example, the first time period can be in the range of from about 1 second to about 1 minute; or from about 1 minute, about 5 minutes, about 10 minutes, or about 15 minutes, to about 30 minutes, about 45 minutes, or about 1 hour; or from about 1 hour, about 2 hours, about 3 hours, about 4 hours, about 5 hours, or about 6 hours, to about 12 hours, or about 24 hours. In some embodiments, the first time period is about 15 minutes.

The first mixing step can be done at varying temperatures; in some embodiments, the mixing is done at room temperature. In some embodiments, the mixing is conducted at an elevated temperature (e.g., greater than room temperature, such as from about 25° C. to about 100° C.).

In some embodiments, the method comprises a second mixing step comprising adding the source of silicon to the aluminum-containing aqueous solution and mixing for a second time period to form the synthesis gel.

The second time period can be in the range of from 1 second to about 24 hours. For example, the second time period can be from about 1 second to about 1 minute; or from about 1 minute, about 5 minutes, about 10 minutes, or about 15 minutes, to about 30 minutes, about 45 minutes, or about 1 hour; or from about 1 hour, about 2 hours, about 3 hours, about 4 hours, about 5 hours, or about 6 hours, to about 12 hours, or about 24 hours. In some embodiments, the second time period is about 2 hours.

The second mixing step can be done at varying temperatures; in some embodiments, the mixing is done at room temperature. In some embodiments, the mixing is conducted at an elevated temperature (e.g., greater than room temperature, such as from about 25° C. to about 100° C.).

In some embodiments, the first and second time periods are each independently from about 1 second to about 24 hours. In some embodiments, the first time period is from about 5 minutes to about 1 hour. In some embodiments, the second time period is from about 5 minutes to about 1 hour.

In some embodiments, the first and second mixing steps are performed at a temperature of from about 20° C. to about 100° C. In some embodiments, the first and second mixing steps are performed at a temperature of from about 20° C. to about 50° C. In some embodiments, the first and second mixing steps are performed at a temperature of from about 20° C. to about 30° C.

Crystallization

Following the mixing of the synthesis gel components, the synthesis gel is then subjected to a crystallization process to crystallize a small pore zeolite. The crystallizing conditions are generally selected so as to promote the formation of a solid precipitate containing zeolite crystals. Typically, the crystallization process comprises maintaining the synthesis gel at an elevated temperature for a period of time. Generally, the reaction mixture as described herein above is heated in a pressure vessel with stirring to yield the desired small pore zeolite crystalline product. In some embodiments, the crystallization optionally further comprises adding zeolite seed crystal to the synthesis gel promote formation of the desired crystal structure. In some embodiments, the seed crystal has the CHA framework. In some embodiments, the seed crystal is a CHA zeolite which has been calcined, and is in the $Na^+$ form.

In some embodiments, the time period can be in the range of from about 24 hours to about 6 days. For example, the time period can be in the range of from about 24 hours, about 30 hours, or about 36 hours, to about 2 days, about 3 days, about 4 days, about 5 days, or about 6 days. In some embodiments, the time period is from about 30 hours to about 3 days. In some embodiments, the time period is about 3 days. The crystallization process can be done at varying temperatures; in some embodiments, the crystallization process is in the range of from about 90° C. to about 250° C., for instance from about 120° C. to about 200° C., or from about 140° C. to about 180° C., with corresponding autogenous pressure. In some embodiments, the temperature is from about 160° C. to about 180° C.

After cooling the synthesis gel, the precipitate comprising the zeolite material is then filtered off, and optionally subjected to further processing. Optionally, the product may be centrifuged. Organic additives may be used to help with the handling and isolation of the solid product. The precipitate is filtered off and the remaining mother liquor is either discarded or can be recycled, e.g., as disclosed in U.S. Patent Application Publication No. 2015/118150 to Yang et al., which is incorporated herein by reference. Spray-drying is an optional step in the processing of the product.

Further Processing

The zeolite product may be thermally treated or calcined in air or nitrogen. Typical calcination temperatures are from about 400° C. to about 850° C. (e.g., about 450° C. to about 750° C.) over a period of 1 to 10 hours. Following initial calcination, the zeolite product is primarily in the alkali metal form (e.g., $Na^+$ form).

The zeolite obtained after calcination may be ion-exchanged in order to reduce the amount of alkali or to exchange with, e.g., ammonium ions. In some embodiments, single or multiple ammonium ion exchanges can be used to yield the $NH^+$ form of the zeolite, which may optionally be further calcined to form the $H^+$ form. Ion-exchange methods are well known in the state of the art and may be applied without departing from the scope of the claims. Ion exchange may be achieved, for instance, by treatment with aqueous ammonium chloride solutions.

Zeolite Properties

In some embodiments, the small pore zeolite obtained by the disclosed process is a cage-containing structure, wherein the maximum diameter of a sphere that can be included in the cage-containing structure is from about 4.4 Å to about 7.8 Å.

In some embodiments, the small pore zeolite crystals resulting from the crystallization may be from about 50 to about 100% crystalline. In some embodiments, the small pore zeolite crystals resulting from the crystallization may be from about 80% to about 99% crystalline, or from about 90% to about 97% crystalline.

In some embodiments, the small pore zeolite has a crystalline framework structure type selected from AEI, AFT, AFX, AFV, AVL, CHA, EAB, ITW, KFI, LEV, LTA, MER, SAS, SAT, and SAV. In some embodiments, the small pore zeolite has a crystalline framework structure type selected from AEI, AFV, AVL, CHA, EAB, ITW, KFI, LEV, LTA, MER, SAS, SAT, and SAV. In some embodiments, the small pore zeolite has the AEI or CHA crystalline framework. In some embodiments, the small pore zeolite has the CHA crystalline framework.

In some embodiments, the small pore zeolite product can be characterized by a silica-to-alumina molar ratio (SAR). In one embodiment, the silica to alumina molar ratio of the small pore zeolite ranges from about 6 to about 100. In certain embodiments, the zeolite product has a SAR of about 10 to about 30. In certain embodiments, the small pore zeolite product has a SAR of from about 20 to about 30.

In some embodiments, the small pore zeolite product is characterized by a relatively low mesopore surface area (MSA) combined with a zeolite surface area (ZSA) that provides good catalytic performance. Pore volume and surface area characteristics can be determined by nitrogen adsorption (BET surface area method). In some embodiments, the MSA of the zeolite product is less than about 75 $m^2/g$ (e.g., about 25 to about 75 $m^2/g$) or less than about 25 $m^2/g$ (e.g., about 5 to about 25 $m^2/g$). The ZSA of the zeolite product is typically at least about 450 $m^2/g$, or at least about 475 $m^2/g$, or at least about 500 $m^2/g$, with an example ZSA range of about 450 to about 600 $m^2/g$ or about 500 to about 600 $m^2/g$.

In some embodiments, the small pore zeolite product can also be characterized by a relatively low normalized ZSA loss after treatment with an $NH_4F$ solution, such as less than about 60% (or less than about 50%) after treatment of the form of the small pore zeolite material with a 40 wt % $NH_4F$ solution at 50° C. with 350 rpm stirring and sonication (35 kHz, 90 W) for 20 minutes followed by drying and calcination at 450° C. for 6 hours. An $NH_4F$ treatment, which selectively etches zeolitic materials at grain boundaries, interfaces between intergrown crystallites and other defect rich regions, was originally developed by Qin et al. [Qin et. al, Angew. Chem. Int. Ed. 2016 55, 19049] as a means of imparting mesoporosity. Herein, this treatment is employed as a means of quantification of defect density, by measuring relative rates of etching.

In some embodiments, the small pore zeolite product as disclosed herein exhibits a controlled aluminum distribution, the controlled aluminum distribution comprising an arrangement of anionic framework Al centers. Such controlled aluminum distribution may be evidenced by properties associated with the zeolite material. For example, in some embodiments, a small pore zeolite as disclosed herein exhibits an altered Al siting and pairing relative to a small pore zeolite prepared by a process wherein the OSDA is a mono-quaternary ammonium cation (e.g., N,N,N-trimethyl-cyclohexanaminium or N,N,N-trimethyladamantan-1-aminium (TMAda) alone). In some embodiments, the altered Al siting and pairing may be characterized by an altered equilibrium $Cu^{+2}$ uptake as compared to the equilibrium $Cu^{+2}$ uptake of a zeolite synthesized with only a mono-quaternary OSDA. Specifically, in some embodiments, zeolites as disclosed herein exhibit a higher uptake of $Cu^{+2}$ than would be anticipated based on their SAR. Such differences may be exhibited at higher concentrations of $Cu^{+2}$ under ion exchange conditions (e.g., at $Cu^{+2}$ concentrations of at least about 0.1 M, at least about 0.2 M, at least about 0.25 M, at least about 0.3 M, or at least about 0.4 M). In some embodiments, the zeolite may be characterized by an altered equilibrium $Cu^{+2}$ uptake at a $Cu^{+2}$ concentration greater than 0.25 M, as compared to a small pore zeolite synthesized with TMAdaOH as the only organic structure directing agent.

In some embodiments, prior to calcining, at least a portion of the pores of the small pore zeolite are occupied by bis-quaternary ammonium cations, and at least a portion of the pores are occupied by mono-quaternary ammonium cations (i.e., the OSDA used to prepare the small pore zeolite), each ammonium cation as described herein above. In some embodiments, from about 1 to about 99% of the pores are occupied by the bis-quaternary ammonium cations, and from about 99 to about 1% of the pores are occupied by the mono-quaternary ammonium cations. In some embodiments, from about 60 to about 40% of the pores are occupied by the bis-quaternary ammonium cations, and from about 40 to about 60% of the pores are occupied by the mono-quaternary ammonium cations. In some embodiments, the bis-quaternary ammonium cations comprise from about 8 to about 20 carbon atoms. In some embodiments, each nitrogen atom of the bis-quaternary ammonium cations bears four substituents, and wherein each substituent is independently selected from the group consisting of alkyl, alkenyl, aryl, arylalkyl, and combinations thereof. In some embodiments, the bis-quaternary ammonium cations have a structure represented by Formula I:

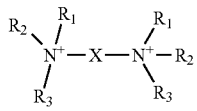

(I)

wherein:
each of substituents $R_1$, $R_2$, and $R_3$ is methyl or ethyl; or optionally, both $R_3$ groups are joined to form a —$(CH_2)_n$— bridge, where n is an integer from 1 to 3; and
X is selected from the group consisting of alkyl, cycloalkyl, alkenyl, aryl, arylalkyl, and combinations thereof, where alkyl, cycloalkyl, alkenyl, aryl, and arylalkyl are each as defined above.

In some embodiments, the bis-quaternary ammonium cations are N1,N1,N1,N3,N3,N3-hexaethylpropane-1,3-diaminium, N1,N1,N1,N4,N4,N4-hexamethylbutane-1,4-diaminium, N1,N1,N1,N4,N4,N4-hexamethylbutane-1,4-diaminium, (E)-N1,N1,N1,N4,N4,N4-hexamethylbut-2-ene-1,4-diaminium, N1,N1,N1,N5,N5,N5-hexamethylpentane-1,5-diaminium, (E)-N1,N1,N1,N5,N5,N5-hexamethylpent-2-ene-1,5-diaminium, N1,N1,N1,N6,N6,N6-hexamethylhexane-1,6-diaminium (hexamethonium), (E)-N1,N1,N1,N6,N6,N6-hexamethylhex-2-ene-1,6-diaminium, (2E,4E)-N1,N1,N1,N6,N6,N6-hexamethylhexa-2,4-diene-1,6-diaminium, N1,N1,N1,N7,N7,N7-hexamethylheptane-1,7-diaminium, N1,N1,N1,N8,N8,N8-hexamethyloctane-1,8-diaminium (octamethonium), N1,N1,N1,N3,N3,N3-hexamethylcyclohexane-1,3-diaminium, N1,N1,N1,N3,N3,N3-hexamethylbicyclo[2.2.1]heptane-1,3-diaminium, N1,N1,N1,N3,N3,N3-hexamethylbenzene-1,3-diaminium, N1,N1,N1,N4,N4,N4-hexamethylcyclohexane-1,4-diaminium, N1,N1,N1,N4,N4,N4-hexamethylbicyclo[2.2.1]heptane-1,4-diaminium, N1,N1,N1,N4,N4,N4-hexamethylbicyclo[2.2.2]octane-1,4-diaminium, N1,N1,N1,N4,N4,N4-hexamethylbenzene-1,4-diaminium, 1,1,4,4-tetramethylpiperazine-1,4-diium, 1,1,3,3-tetramethylhexahydropyrimidine-1,3-diium, 1,1'-(1,3-phenylene)bis(N,N,N-trimethylmethanaminium), 1,1'-(1,4-phenylene)bis(N,N,N-trimethylmethanaminium), or a combination thereof. In some embodiments, the bis-quaternary ammonium cations are selected from Table 1. In some embodiments, the bis-quaternary ammonium cations are hexamethonium or octamethonium.

In some embodiments, the mono-quaternary ammonium cations comprise from about 4 to about 14 carbon atoms. In the nitrogen atom of the mono-quaternary ammonium cations bears four substituents, wherein each substituent is independently selected from the group consisting of alkyl, alkenyl, aryl, arylalkyl, and combinations thereof.

In some embodiments, the mono-quaternary ammonium cations have a structure represented by Formula II:
wherein:

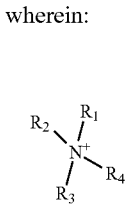

(II)

$R_1$, $R_2$, and $R_3$ are each methyl or ethyl; and
$R_4$ is selected from the group consisting of methyl, ethyl, hydroxyethyl, cyclohexyl, azabicycloheptyl, adamantly, and phenyl;
or optionally, $R_3$ and $R_4$ together, or $R_2$, $R_3$, and $R_4$ together, may be joined to form a mono- or bicylic ring system, which may optionally be substituted with one or more methyl or OH groups.

In some embodiments, the mono-quaternary ammonium cations are tetraethylammonium, 2-hydroxy-N,N,N-trimethylethan-1-aminium, N,N,N-trimethylcyclohexanaminium, N,N,N-trimethyladamantan-1-aminium (TMAda), N,N,N-trimethylbicyclo[2.2.1]heptan-2-aminium, N,N,N-trimethylbenzenaminium, 1,1-dimethylpiperidin-1-ium, 1,1,3,5-tetramethylpiperidin-1-ium, 1-methylquinuclidin-1-ium, 3-hydroxy-1-methylquinuclidin-1-ium, or a combination thereof. In some embodiments, the mono-quaternary ammonium cations are selected from Table 2. In some embodiments, the mono-quaternary ammonium cations are TMAda. In some embodiments, the bis-quaternary ammonium cations are hexamethonium or octamethonium, and the mono-quaternary ammonium cations are TMAda.

The small pore zeolite sysnthesize by the methods of the present invention comprises a carbon to nitrogen ratio, a C/N ratio, in the range of 7 to 15.

Promoted Zeolites

In some embodiments, the small pore zeolite material as disclosed herein is further treated with a promoter metal to form a metal-promoted zeolite catalyst (e.g., ion-exchanged). As used herein, the term "promoted" refers to a metal component ("promoter metal") that is intentionally added to the molecular sieve material, as opposed to impurities inherent in the molecular sieve. Thus, a promoter is intentionally added to enhance activity of a catalyst compared to a catalyst that does not have promoter intentionally added. The promoter metal actively participates in the promotion of a chemical reaction, e.g., copper participates in the conversion of nitrogen oxides, and is therefore often referred to as the active metal. In order to promote the selective catalytic reduction of nitrogen oxides in the presence of ammonia, in one or more embodiments, a suitable metal(s) is independently exchanged into the disclosed zeolite material.

In some embodiments, the disclosed zeolites are promoted with a promoter metal selected from the group consisting of alkali metals, alkaline earth metals, transition metals in Groups IIIB, IVB, VB, VIB, VIIB, VIIIB, IB, and IIB, Group IIIA elements, Group IVA elements, lanthanides, actinides, and combinations thereof. In some embodiments, further promoter metals that can be used to prepare promoted zeolites of the disclosed catalyst compositions include, but are not limited to, copper (Cu), cobalt (Co), nickel (Ni), lanthanum (La), manganese (Mn), iron (Fe), vanadium (V), silver (Ag), cerium (Ce), neodymium (Nd), praseodymium (Pr), titanium (Ti), chromium (Cr), zinc (Zn), tin (Sn), niobium (Nb), molybdenum (Mo), hafnium (Hf), yttrium (Y), tungsten (W), and combinations thereof. In some embodiments, the promoter metal is copper or iron. For example, copper or iron can be ion-exchanged to form Cu-Chabazite or Fe-Chabazite. When copper acetate is used, the copper concentration of the liquid copper solution used in the copper ion-exchange is, in specific embodiments, in the range from about 0.01 to about 0.4 molar, more specifically in the range from about 0.05 to about 0.3 molar.

The promoter metal can be exchanged into the zeolite by a liquid phase exchange process, where the soluble metal ions exchange with the proton or ammonium or sodium ions located within the pores of the zeolite. The exchange can also be carried out by a solid-state process, where promoter metal oxide or metal salt solid particles are mixed with a zeolite powder and processed under certain temperature and gas environments that may or may not contain steam. The exchange process can also be accomplished via an in-situ process during slurry preparation, where fine metal oxide particles are suspended in a zeolite slurry under conditions suitable for solid-liquid interaction.

In some embodiments, prior to the exchange of a promoter metal into the zeolite material as disclosed herein, the zeolite must be $NH_4^+$ exchanged and calcined, as known in the art to obtain the $H^+$ form of the respective material.

For additional promotion of SCR of oxides of nitrogen, in some embodiments, the zeolite can be promoted with two or more metals (e.g., copper in combination with one or more other metals). Where two or more metals are to be included in a promoted zeolitic material, multiple metal precursors (e.g., copper and iron precursors) can be ion-exchanged at the same time or separately. In certain embodiments, the second metal can be exchanged into a zeolite material that has first been promoted with the first metal (e.g., a second metal can be exchanged into a copper-promoted zeolite material).

The amount of metal ion exchanged in the metal promoted zeolite may vary. The promoter metal content, calculated as the metal oxide, in one or more embodiments, independently ranges from about 0.01 wt % to about 15 wt %, from about 0.5 wt % to about 12 wt %, or from about 1.0 wt % to about 10 wt %, based on the total weight of the corresponding calcined zeolite (including the promoter metal) and reported on a volatile-free basis. In some embodiments, promoter metal content, calculated as the oxide is at least about 0.1 wt %, based on the total weight of the calcined zeolite (including promoter) and reported on a volatile-free basis. In specific embodiments, the promoter metal of the zeolite comprises Cu, and the Cu content, calculated as CuO is in the range of about 0.1 wt % to about 20 wt %, including about 0.5 wt % to about 17 wt %, about 2 wt % to about 15 wt %, or about 2 wt % to about 10 wt %, in each case based on the total weight of the calcined zeolite reported on a volatile free basis.

In some embodiments, the zeolite (including promoter metal) can be defined by the ratio of promoter metal to aluminum within the promoted zeolite. For example, in some embodiments, the promoter metal to aluminum weight ratio is in the range of from about 0.002 to about 0.5. In specific embodiments, the promoter metal of the zeolite comprises Cu the copper to aluminum atomic ratio of the zeolites is from about 0.1 to about 0.5 (e.g., the Cu/Al ratio is about 0.1 to about 0.5).

Copper species (e.g., copper oxide, metal, and ion-exchanged copper) which may be present in a zeolitic material can be identified by monitoring the perturbed T-O-T bond (Si—O—Al and Si—O—Si) vibrations by diffuse reflectance Fourier transform infrared (DRIFT) spectroscopy. The use of this FTIR technique has been demonstrated in the literature, in for example, Giamello et al., J. Catal. 136, 510-520 (1992). The structural vibrations of T-O-T bonds in zeolites have absorption peaks at 1300-1000 $cm^{-1}$ and 850-750 $cm^{-1}$ for the asymmetric and symmetric vibration mode, respectively. The frequency of asymmetric T-O-T vibration of the oxygen containing ring is sensitive to the interaction with cations, and therefore the IR band shifts from typical 1000-1300 $cm^{-1}$ (position characteristic of unperturbed ring) to about 850-1000 $cm^{-1}$ when interacting with a cation. The shifted band appears in the transmission window between two strong bands of T-O-T asymmetric and symmetric vibrations. The position of such a shifted band depends on the properties of the cations. Such perturbed T-O-T bond vibrations are observed when copper ions are exchanged into the cationic exchange position of zeolite framework structures, due to strong interaction between copper ions and neighboring oxygen atoms in the framework structure. The peak position depends on the status of compensated cations and the structure of the zeolite framework. In some embodiments, a powder sample of the copper promoted zeolite as disclosed herein exhibits a T-O-T bond peak as measured by DRIFT spectroscopy which is shifted to a higher wavenumber relative to a copper promoted zeolite prepared by a process wherein the OSDA is a mono-quaternary ammonium ion (e.g., N,N,N-trimethylcyclohexanaminium or N,N,N-trimethyladamantan-1-aminium (TMAda) alone).

SCR Catalyst Compositions

The present disclosure provides a selective catalytic reduction (SCR) catalyst composition effective to catalyze the reduction of $NO_x$ from an engine exhaust gas, such as from a lean burn engine, in the presence of a reductant, the catalyst composition comprising a promoted small pore zeolite as disclosed herein.

In some embodiments, the SCR catalyst composition may further comprise a binder, for example, a $ZrO_2$ binder derived from a suitable precursor such as zirconyl acetate or any other suitable zirconium precursor such as zirconyl nitrate. Zirconyl acetate binder provides a coating that remains homogeneous and intact after thermal aging, for example, when the catalyst is exposed to high temperatures of at least about 600° C., for example, about 800° C. and higher and high water vapor environments of about 5% or more. Other potentially suitable binders include, but are not limited to, alumina and silica. Alumina binders include aluminum oxides, aluminum hydroxides and aluminum oxyhydroxides. Aluminum salts and colloidal forms of alumina many also be used. Silica binders include various forms of $SiO_2$, including silicates and colloidal silica. Binder compositions may include any combination of zirconia, alumina and silica. Other exemplary binders include boehemite, gamma-alumina, or delta/theta alumina, as well as silica sol. When present, the binder is typically used in an amount of about 1-5 wt % of the total washcoat loading. Alternatively the binder can be zirconia-based or silica-based, for example zirconium acetate, zirconia sol or silica sol. When present, the alumina binder is typically used in an amount of about 0.05 g/in$^3$ to about 1 g/in$^3$.

Catalytic Articles

In another aspect is provided an SCR article effective to catalyze the reduction of $NO_x$ from an engine exhaust gas, such as from a lean burn engine, in the presence of a reductant, the SCR article comprising a substrate having an inlet end and an outlet end defining an overall length, and the SCR catalyst composition as disclosed herein disposed on at least a portion thereof.

Substrates

In one or more embodiments, the present SCR catalyst compositions are disposed on a substrate to form a catalytic article. Catalytic articles comprising the substrates are generally employed as part of an exhaust gas treatment system (e.g., catalyst articles including, but not limited to, articles including the SCR compositions disclosed herein). Useful substrates are 3-dimensional, having a length and a diameter and a volume, similar to a cylinder. The shape does not necessarily have to conform to a cylinder. The length is an axial length defined by an inlet end and an outlet end.

According to one or more embodiments, the substrate for the disclosed composition(s) may be constructed of any material typically used for preparing automotive catalysts and will typically comprise a metal or ceramic honeycomb structure. The substrate typically provides a plurality of wall surfaces upon which the washcoat composition is applied and adhered, thereby acting as a substrate for the catalyst composition.

Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate and the like.

Substrates may also be metallic, comprising one or more metals or metal alloys. A metallic substrate may include any metallic substrate, such as those with openings or "punchouts" in the channel walls. The metallic substrates may be employed in various shapes such as pellets, compressed metallic fibers, corrugated sheet or monolithic foam. Specific examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt % (weight percent) of the alloy, for instance, about 10 to about 25 wt % chromium, about 1 to about 8 wt. % of aluminum, and from 0 to about 20 wt % of nickel, in each case based on the weight of the substrate. Examples of metallic substrates include those having straight channels; those having protruding blades along the axial channels to disrupt gas flow and to open communication of gas flow between channels; and those having blades and also holes to enhance gas transport between channels allowing for radial gas transport throughout the monolith.

Any suitable substrate for the catalytic articles disclosed herein may be employed, such as a monolithic substrate of the type having fine, parallel gas flow passages extending there through from an inlet or an outlet face of the substrate such that passages are open to fluid flow there through ("flow-through substrate"). Another suitable substrate is of the type have a plurality of fine, substantially parallel gas flow passages extending along the longitudinal axis of the substrate where, typically, each passage is blocked at one end of the substrate body, with alternate passages blocked at opposite end-faces ("wall-flow filter"). Row-through and wall-flow substrates are also taught, for example, in International Application Publication No. WO2016/070090, which is incorporated herein by reference in its entirety.

In some embodiments, the catalyst substrate comprises a honeycomb substrate in the form of a wall-flow filter or a flow-through substrate. In some embodiments, the substrate is a wall-flow filter. In some embodiments, the substrate is a flow-through substrate. Flow-through substrates and wall-flow filters will be further discussed herein below.

Flow-Through Substrates

In some embodiments, the substrate is a flow-through substrate (e.g., monolithic substrate, including a flow-through honeycomb monolithic substrate). Flow-through substrates have fine, parallel gas flow passages extending from an inlet end to an outlet end of the substrate such that passages are open to fluid flow. The passages, which are essentially straight paths from their fluid inlet to their fluid outlet, are defined by walls on or in which a catalytic coating is disposed so that gases flowing through the passages contact the catalytic material. The flow passages of the flow-through substrate are thin-walled channels, which can be of any suitable cross-sectional shape and size such as trapezoidal, rectangular, square, sinusoidal, hexagonal, oval, circular, etc. The flow-through substrate can be ceramic or metallic as described above.

Flow-through substrates can, for example, have a volume of from about 50 in$^3$ to about 1200 in$^3$, a cell density (inlet openings) of from about 60 cells per square inch (cpsi) to about 500 cpsi or up to about 900 cpsi, for example from about 200 to about 400 cpsi and a wall thickness of from about 50 to about 200 microns or about 400 microns.

Wall-Flow Filter Substrates

In some embodiments, the substrate is a wall-flow filter, which generally has a plurality of fine, substantially parallel gas flow passages extending along the longitudinal axis of the substrate. Typically, each passage is blocked at one end of the substrate body, with alternate passages blocked at opposite end-faces. Such monolithic wall-flow filter substrates may contain up to about 900 or more flow passages (or "cells") per square inch of cross-section, although far fewer may be used. For example, the substrate may have from about 7 to 600, more usually from about 100 to 400, cells per square inch ("cpsi"). The cells can have cross-sections that are rectangular, square, circular, oval, triangular, hexagonal, or are of other polygonal shapes. The wall-flow filter substrate can be ceramic or metallic as described above.

Figure 2:
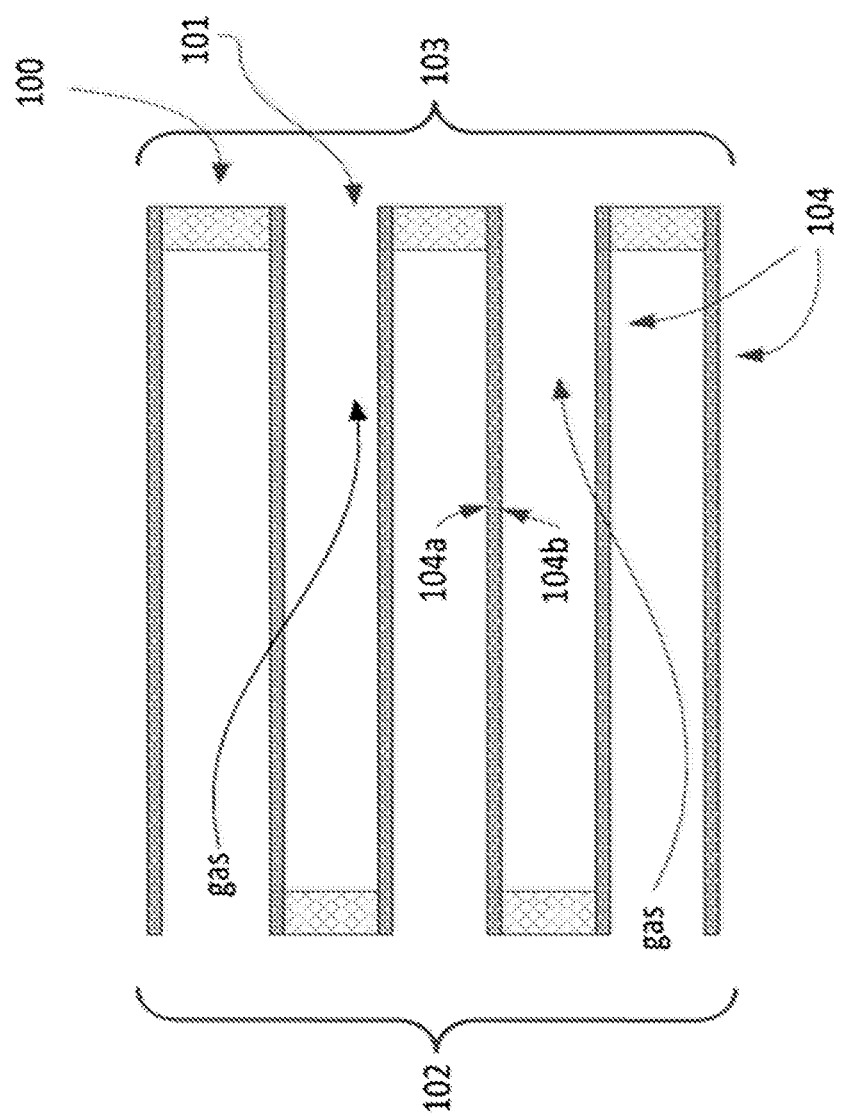
FIG. 2 is a is a cross-sectional view of a section of a wall-flow filter substrate.

Referring to FIG. 1, the exemplary wall-flow filter substrate has a cylindrical shape and a cylindrical outer surface having a diameter D and an axial length L. A cross-section view of a monolithic wall-flow filter substrate section is illustrated in FIG. 2, showing alternating plugged and open passages (cells). Blocked or plugged ends 100 alternate with open passages 101, with each opposing end open and blocked, respectively. The filter has an inlet end 102 and outlet end 103. The arrows crossing porous cell walls 104 represent exhaust gas flow entering the open cell ends, diffusion through the porous cell walls 104 and exiting the open outlet cell ends. Plugged ends 100 prevent gas flow and encourage diffusion through the cell walls. Each cell wall will have an inlet side 104a and outlet side 104b. The passages are enclosed by the cell walls.

The wall-flow filter article substrate may have a volume of, for instance, from about 50 cm$^3$, about 100 in$^3$, about 200 in$^3$, about 300 in$^3$, about 400 in$^3$, about 500 in$^3$, about 600 in$^3$, about 700 in$^3$, about 800 in$^3$, about 900 in$^3$ or about 1000 in$^3$ to about 1500 in$^3$, about 2000 in$^3$, about 2500 in$^3$, about 3000 in$^3$, about 3500 in$^3$, about 4000 in$^3$, about 4500 in$^3$ or about 5000 in$^3$. Wall-flow filter substrates typically have a wall thickness from about 50 microns to about 2000 microns, for example from about 50 microns to about 450 microns or from about 150 microns to about 400 microns.

The walls of the wall-flow filter are porous and generally have a wall porosity of at least about 40% or at least about 50% with an average pore diameter of at least about 10 microns prior to disposition of the functional coating. For instance, the wall-flow filter article substrate in some embodiments will have a porosity of ≥40%, ≥50%, ≥60%, ≥65% or ≥70%. For instance, the wall-flow filter article substrate will have a wall porosity of from about 50%, about 60%, about 65% or about 70% to about 75% and an average pore diameter of from about 10, or about 20, to about 30, or about 40 microns prior to disposition of a catalytic coating. The terms "wall porosity" and "substrate porosity" mean the same thing and are interchangeable. Porosity is the ratio of void volume (or pore volume) divided by the total volume of a substrate material. Pore size and pore size distribution are typically determined by Hg porosimetry measurement.

Substrate Coating Process

To produce SCR catalytic articles of the present disclosure, a substrate as described herein is coated with an SCR catalyst composition as disclosed herein. The coatings are "catalytic coating compositions" or "catalytic coatings." A "catalyst composition" and a "catalytic coating composition" are synonymous.

Generally, the catalyst composition is prepared and coated on a substrate as described herein. This method can comprise mixing the catalyst composition (or one or more components of the catalyst composition) as generally disclosed herein with a solvent (e.g., water) to form a slurry for purposes of coating a catalyst substrate. In addition to the catalyst composition, the slurry may optionally contain various additional components, Typical additional components include, but are not limited to, binders as described herein above, additives to control, e.g., pH and viscosity of the slurry. Additional components can include hydrocarbon (HC) storage components (e.g., zeolites), associative thickeners, and/or surfactants (including anionic, cationic, non-ionic or amphoteric surfactants). A typical pH range for the slurry is about 3 to about 6. Addition of acidic or basic species to the slurry can be carried out to adjust the pH accordingly. For example, in some embodiments, the pH of the slurry is adjusted by the addition of aqueous acetic acid.

The slurry can be milled to reduced particle size and to enhance mixing of the particles and formation of a homogenous material. The milling can be accomplished in a ball mill, continuous mill, or other similar equipment, and the solids content of the slurry may be, e.g., about 20-60 wt %, more particularly about 20-40 wt %. In one embodiment, the post-milling slurry is characterized by a $D_{90}$ particle size of about 1 to about 40 microns, preferably 2 to about 20 microns, more preferably about 4 to about 15 microns The present catalyst compositions may typically be applied in the form of one or more washcoats containing the SCR catalyst composition as disclosed herein. A washcoat is formed by preparing a slurry containing a specified solids content (e.g., about 10 to about 60% by weight) of catalyst composition (or one or more components of the catalyst composition) in a liquid vehicle, which is then applied to a substrate using any washcoat technique known in the art and dried and calcined to provide a coating layer. If multiple coatings are applied, the substrate is dried and/or calcined after each washcoat is applied and/or after the number of desired multiple washcoats are applied. In one or more embodiments, the catalytic material(s) are applied to the substrate as a washcoat.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat layer (coating layer) can be repeated as needed to build the coating to the desired loading level or thickness, meaning more than one washcoat may be applied.

Coating Configurations

The present catalytic coating may comprise one or more coating layers, where at least one layer comprises the present catalyst composition or one or more components of the catalyst composition. The catalytic coating may comprise one or more thin, adherent coating layers disposed on and in adherence to least a portion of a substrate. The entire coating comprises the individual "coating layers".

In some embodiments, the present catalytic articles may include the use of one or more catalyst layers and combinations of one or more catalyst layers. Catalytic materials may be present on the inlet side of the substrate wall alone, the outlet side alone, both the inlet and outlet sides, or the wall itself may consist all, or in part, of the catalytic material. The catalytic coating may be on the substrate wall surfaces and/or in the pores of the substrate walls, that is "in" and/or "on" the substrate walls. Thus, the phrase "a washcoat disposed on the substrate" means on any surface, for example on a wall surface and/or on a pore surface.

The washcoat(s) can be applied such that different coating layers may be in direct contact with the substrate. Alternatively, one or more "undercoats" may be present, so that at least a portion of a catalytic coating layer or coating layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Alternatively, the present catalyst composition may be in a top coating layer over a bottom coating layer. The catalyst composition may be present in a top and a bottom layer. Any one layer may extend the entire axial length of the substrate, for instance a bottom layer may extend the entire axial length of the substrate and a top layer may also extend the entire axial length of the substrate over the bottom layer. Each of the top and bottom layers may extend from either the inlet or outlet end.

For example, both bottom and top coating layers may extend from the same substrate end where the top layer partially or completely overlays the bottom layer and where the bottom layer extends a partial or full length of the substrate and where the top layer extends a partial or full length of the substrate. Alternatively, a top layer may overlay a portion of a bottom layer. For example, a bottom layer may extend the entire length of the substrate and the top layer may extend about 10%, about 20%, about 30%, about 40%, about 50%, about 60%, about 70%, about 80% or about 90% of the substrate length, from either the inlet or outlet end.

Alternatively, a bottom layer may extend about 10%, about 15%, about 25%, about 30%, about 40%, about 45%, about 50%, about 55%, about 60%, about 65%, about 70%, about 75%, about 80%, about 85% or about 95% of the substrate length from either the inlet end or outlet end and a top layer may extend about 10%, about 15%, about 25%, about 30%, about 40%, about 45%, about 50%, about 55%, about 60%, about 65%, about 70%, about 75%, about 80%, about 85% or about 95% of the substrate length from either the inlet end of outlet end, wherein at least a portion of the top layer overlays the bottom layer. This "overlay" zone may for example extend from about 5% to about 80% of the substrate length, for example about 5%, about 10%, about 20%, about 30%, about 40%, about 50%, about 60% or about 70% of the substrate length.

In some embodiments, the oxidation catalyst composition as disclosed herein, disposed on the substrate as disclosed herein; comprises a first washcoat disposed on at least a portion of the length of the catalyst substrate.

In some embodiments, the first washcoat is disposed directly on the catalyst substrate; and a second washcoat (either the same or comprising a different catalyst or catalyst component) is disposed on at least a portion of the first washcoat. In some embodiments, the second washcoat is disposed directly on the catalyst substrate, and the first washcoat is disposed on at least a portion of the second washcoat. In some embodiments, the first washcoat is disposed directly on the catalyst substrate from the inlet end to a length of from about 10% to about 50% of the overall length; and the second washcoat is disposed on at least a portion of the first washcoat. In some embodiments, the second washcoat is disposed directly on the catalyst substrate from the inlet end to a length of from about 50% to about 100% of the overall length; and the first washcoat is disposed on at least a portion of the second washcoat. In some embodiments, the first washcoat is disposed directly on the catalyst substrate from the inlet end to a length of from about 20% to about 40% of the overall length, and the second washcoat extends from the inlet end to the outlet end. In some embodiments, the first washcoat is disposed directly on the catalyst substrate from the outlet end to a length of from about 10% to about 50% of the overall length, and the second washcoat is disposed on at least a portion of the first washcoat. In some embodiments, the first washcoat is disposed directly on the catalyst substrate from the outlet end to a length from about 20 to about 40% of the overall length, and the second washcoat extends from the inlet end to the outlet end. In some embodiments, the second washcoat is disposed directly on the catalyst substrate from the outlet end to a length of from about 50% to about 100% of the overall length, and the first washcoat is disposed on at least a portion of the second washcoat, in some embodiments, the first washcoat is disposed directly on the catalyst substrate covering 100% of the overall length, and the second washcoat is disposed on the first washcoat covering 100% of the overall length. In some embodiments, the second washcoat is disposed directly on the catalyst substrate covering 100% of the overall length, and the first washcoat is disposed on the second washcoat covering 100% of the overall length.

The catalytic coating may advantageously be "zoned," comprising zoned catalytic layers, that is, where the catalytic coating contains varying compositions across the axial length of the substrate. This may also be described as "laterally zoned". For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, for example, extend from about 5% to about 80% of the substrate length, for example about 5%, about 10%, about 20%, about 30%, about 40%, about 50%, about 60% or about 70% of the substrate length.

Zones of the present disclosure are defined by the relationship of coating layers. With respect to different coating layers, there are a number of possible zoning configurations. For example, there may be an upstream zone and a downstream zone, there may be an upstream zone, a middle zone and a downstream zone, there may four different zones, etc. Where two layers are adjacent and do not overlap, there are upstream and downstream zones. Where two layers overlap to a certain degree, there are upstream, downstream and middle zones. Where for example, a coating layer extends the entire length of the substrate and a different coating layer extends from the outlet end a certain length and overlays a portion of the first coating layer, there are upstream and downstream zones.

For instance, the SCR catalytic article may comprise an upstream zone comprising the first washcoat layer; and a downstream zone comprising the second washcoat layer comprising a different catalyst material or component. Alternatively, an upstream zone may comprise the second washcoat layer and a downstream zone may comprise the first washcoat layer.

In some embodiments, the first washcoat is disposed on the catalyst substrate from the inlet end to a length of from about 10% to about 50% of the overall length; and the second washcoat is disposed on the catalyst substrate from the outlet end to a length of from about 50% to about 90% of the overall length. In some embodiments, the first washcoat is disposed on the catalyst substrate from the outlet end to a length of from about 10% to about 50% of the overall length; and wherein the second washcoat is disposed on the catalyst substrate from the inlet end to a length of from about 50% to about 90% of the overall length.

Figure 3A:
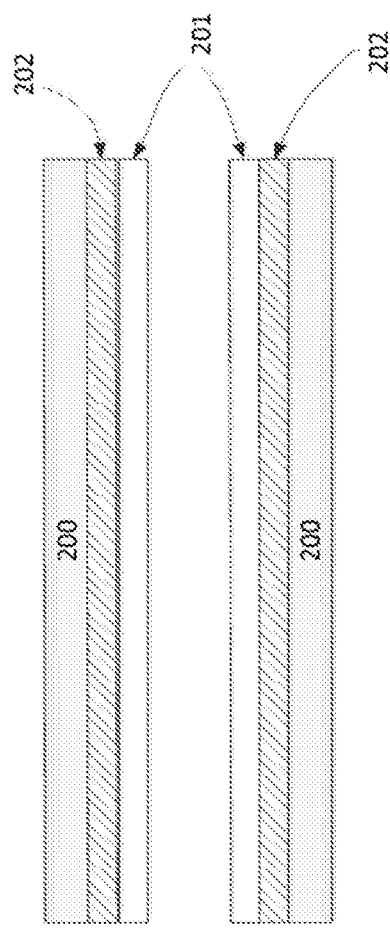
FIG. 3A is a cross-sectional view of an embodiment of a layered catalytic article of the present disclosure.
Figure 3B:
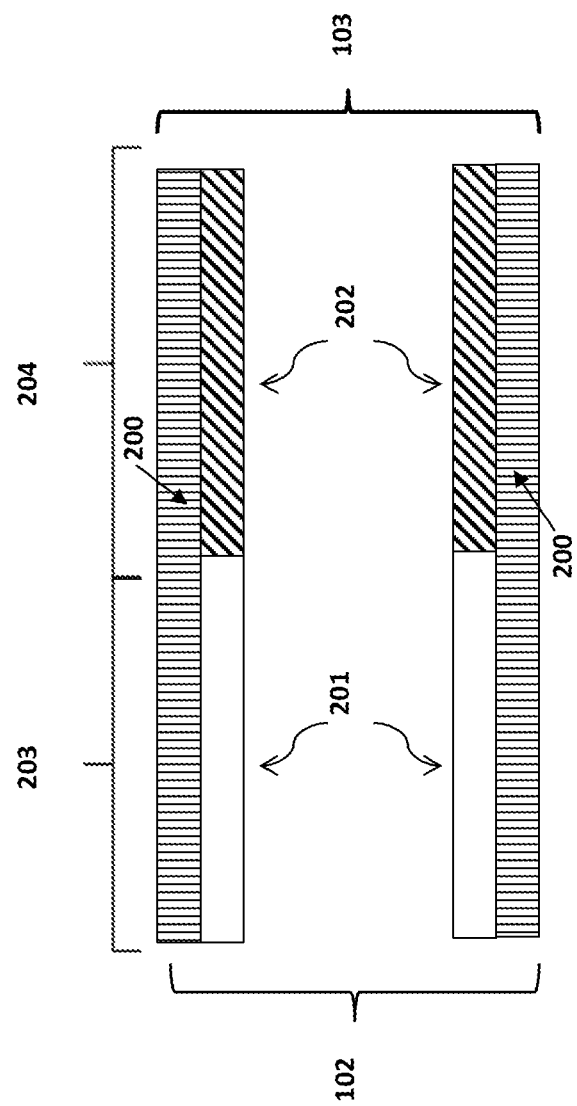
FIG. 3B is a cross-sectional view of an embodiment of a zoned catalytic article of the present disclosure.
Figure 3C:
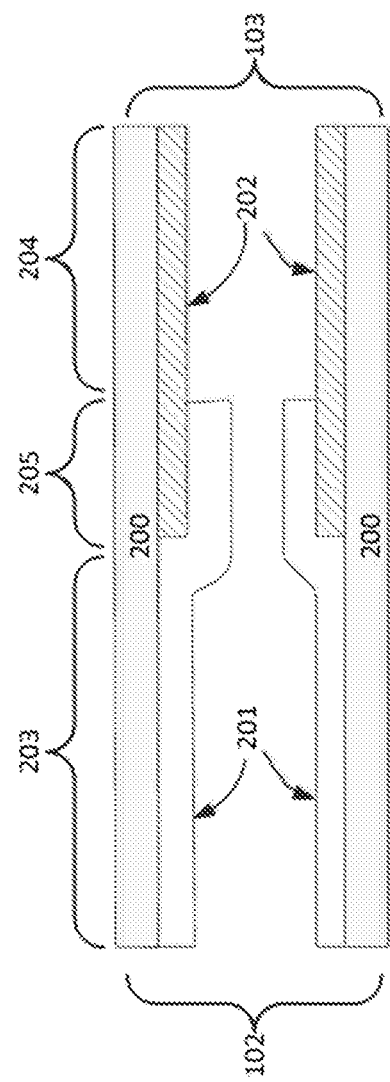
FIG. 3C is a cross-sectional view of an embodiment of a layered and zoned catalytic article of the present disclosure.

FIGS. 3a, 3b, and 3c show some possible coating layer configurations with two coating layers. Shown are substrate walls 200 onto which coating layers 201 (top coat) and 202 (bottom coat) are disposed. This is a simplified illustration, and in the case of a porous wall-flow substrate, not shown are pores and coatings in adherence to pore walls and not shown are plugged ends. In FIG. 3a, coating layers 201 and 202 each extend the entire length of the substrate with top layer 201 overlaying bottom layer 202. The substrate of FIG. 3a does not contain a zoned coating configuration, FIG. 3b is illustrative of a zoned configuration having a coating layer 202 which extends from the outlet about 50% of the substrate length to form a downstream zone 204, and a coating layer 201 which extends from the inlet about 50% of the substrate length, providing an upstream zone 203. In FIG. 3c, bottom coating layer 202 extends from the outlet about 50% of the substrate length and top coating layer 201 extends from the inlet greater than 50% of the length and overlays a portion of layer 202, providing an upstream zone 203, a middle overlay zone 205 and a downstream zone 204. FIGS. 3a, 3b, and 3c may be useful to illustrate SCR catalyst composition coatings on a wall-through substrate or a flow-through substrate.

In some embodiments, the substrate is a honeycomb substrate. In some embodiments, the honeycomb substrate is a flow-through substrate or a wall-flow filter. In certain embodiments, the SCR catalyst composition as disclosed herein, when incorporated into an SCR catalytic article as disclosed herein, is effective to catalyze the reduction of $NO_x$ from an engine exhaust gas, such as exhaust from a lean burn engine, in the presence of a reductant. In some embodiments, the SCR article can be characterized by SCR activity at various temperatures. In some embodiments, the effective reduction of $NO_x$ is at a temperature that is above about 150° C. and below about 700° C. In some embodiments, the effective reduction of $NO_x$ is at a temperature of from about 200° C. to about 600° C.

Exhaust Gas Treatment Systems

In a further aspect is provided a system for treatment of an exhaust gas stream from an engine, the system comprising the SCR article as disclosed herein, positioned downstream from and in fluid communication with an engine that produces an exhaust gas stream, such as a lean burn engine. The engine can be, e.g., a diesel engine which operates at combustion conditions with air in excess of that required for stoichiometric combustion, i.e. lean conditions. In other embodiments, the engine can be a gasoline engine (e.g., a lean burn gasoline engine) or an engine associated with a stationary source (e.g., electricity generators or pumping stations). Exhaust gas treatment systems generally contain more than one catalytic article positioned downstream from the engine in fluid communication with the exhaust gas stream. A system may contain, for instance, a selective catalytic reduction catalyst (SCR) as disclosed herein, a diesel oxidation catalyst (DOC) and one or more articles containing a reductant injector, a soot filter, an ammonia oxidation catalyst (AMOx) or a lean NOx trap (LNT). An article containing a reductant injector is a reduction article. A reduction system includes a reductant injector and/or a pump and/or a reservoir, etc. The present treatment system may further comprise a soot filter and/or an ammonia oxidation catalyst, A soot filter may be uncatalyzed or may be catalyzed (CSF). For instance, the present treatment system may comprise, from upstream to downstream an article containing a DOC, a CSF, an urea injector, a SCR article and an article containing an AMOx. A lean NOx trap (LNT) may also be included.

The relative placement of the various catalytic components present within the emission treatment system can vary. In the present exhaust gas treatment systems and methods, the exhaust gas stream is received into the article(s) or treatment system by entering the upstream end and exiting the downstream end. The inlet end of a substrate or article is synonymous with the "upstream" end or "front" end. The outlet end is synonymous with the "downstream" end or "rear" end. The treatment system is, in general, downstream of and in fluid communication with an internal combustion engine.

Figure 4:
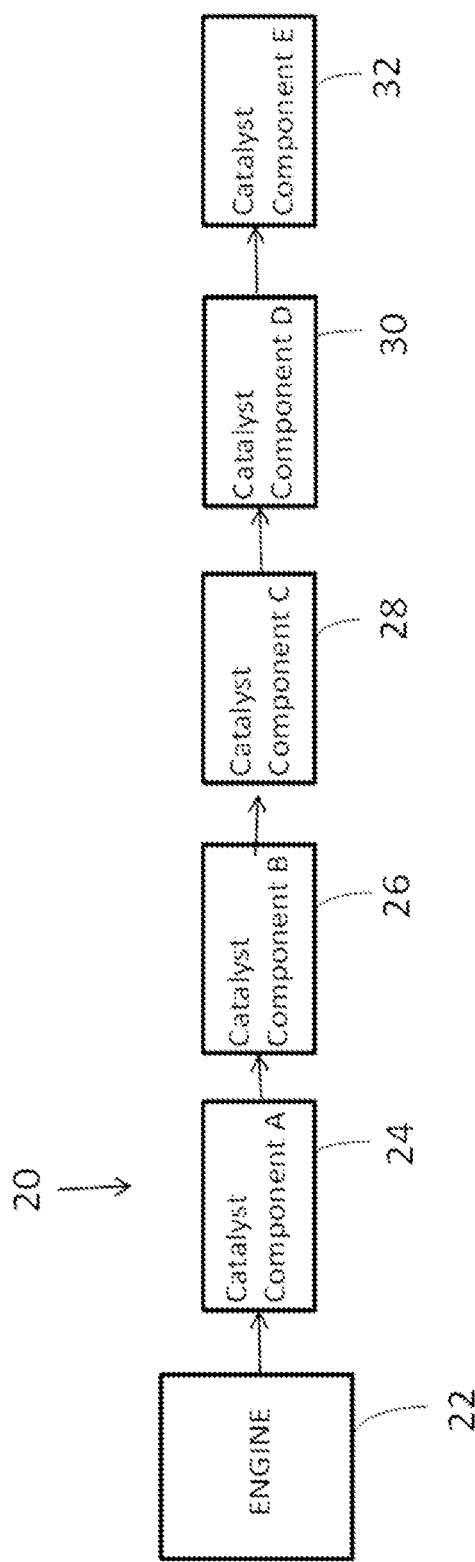
FIG. 4 is a schematic depiction of an embodiment of an emission treatment system in which an SCR catalyst article of the present disclosure is utilized.

One exemplary emission treatment system is illustrated in FIG. 4, which depicts a schematic representation of an emission treatment system 20. As shown, the emission treatment system can include a plurality of catalyst components in series downstream of an engine 22, such as a lean burn engine. At least one of the catalyst components will be the SCR catalyst of the invention as set forth herein. The catalyst composition of the invention could be combined with numerous additional catalyst materials and could be placed at various positions in comparison to the additional catalyst materials. FIG. 4 illustrates five catalyst components, 24, 26, 28, 30, 32 in series; however, the total number of catalyst components can vary and five components is merely one example.

Without limitation, Table 3 presents various exhaust gas treatment system configurations of one or more embodiments. It is noted that each catalyst is connected to the next catalyst via exhaust conduits such that the engine is upstream of catalyst A, which is upstream of catalyst B, which is upstream of catalyst C, which is upstream of catalyst D, which is upstream of catalyst E (when present). The reference to Components A-E in the table can be cross-referenced with the same designations in FIG. 4.

The LNT catalyst noted in Table 3 can be any catalyst conventionally used as a $NO_x$ trap, and typically comprises $NO_x$-adsorber compositions that include base metal oxides (BaO, MgO, $CeO_2$, and the like) and a platinum group metal for catalytic NO oxidation and reduction (e.g., Pt and Rh).

The LT-NA catalyst noted in Table 3 can be any catalyst that can adsorb $NO_x$ (e.g., NO or $NO_2$) at low temperatures (<250° C.) and release it to the gas stream at high temperatures (>250° C.). The released $NO_x$ is generally converted to $N_2$ and $H_2O$ over a down-stream SCR or SCRoF catalyst. Typically, a LT-NA catalyst comprises Pd-promoted zeolites or Pd-promoted refractory metal oxides.

Reference to SCR in the table refers to an SCR catalyst, which may include the SCR catalyst composition of the invention. Reference to SCRoF (or SCR on filter) refers to a particulate or soot filter (e.g., a wall-flow filter), which can include the SCR catalyst composition of the invention. Where both SCR and SCRoF are present, one or both can include the SCR catalyst of the invention, or one of the catalysts could include a conventional SCR catalyst (e.g., SCR catalyst with conventional metal loading level).

Reference to AMOx in the table refers to an ammonia oxidation catalyst, which can be provided downstream of the catalyst of one more embodiments of the invention to remove any slipped ammonia from the exhaust gas treatment system. In specific embodiments, the AMOx catalyst may comprise a PGM component. In one or more embodiments, the AMOx catalyst may comprise a bottom coat with PGM and a top coat with SCR functionality.

As recognized by one skilled in the art, in the configurations listed in Table 3, any one or more of components A, B, C, D, or E can be disposed on a particulate filter, such as a wall flow filter, or on a flow-through honeycomb substrate. In one or more embodiments, an engine exhaust system comprises one or more catalyst compositions mounted in a position near the engine (in a close-coupled position, CC), with additional catalyst compositions in a position underneath the vehicle body (in an underfloor position, UF). In one or more embodiments, the exhaust gas treatment system may further comprise a urea injection component.

TABLE 3

Possible exhaust gas treatment system configurations

| Component A | Component B | Component C | Component D | Component E |
|---|---|---|---|---|
| DOC | SCR | OptionalAMOx | — | — |
| DOC | SCRoF | Optional AMOx | — | — |
| DOC | SCRoF | SCR | Optional AMOx | — |
| DOC | SCR | SCRoF | Optional AMOx | — |
| DOC | CSF | SCR | Optional AMOx | — |
| LNT | CSF | SCR | Optional AMOx | — |
| LNT | SCRoF | SCR | Optional AMOx | — |

Method of Treating Engine Exhaust

Another aspect of the present invention is directed to a method of treating the exhaust gas stream of an engine, such as from a lean burn engine, particularly a lean burn gasoline engine or a diesel engine. The method can include placing the SCR catalyst article according to one or more embodiments of the invention downstream from an engine and flowing the engine exhaust gas stream over the catalyst. In one or more embodiments, the method further comprising placing additional catalyst components downstream from the engine as noted above. The present catalyst compositions, articles, systems, and methods are suitable for treatment of exhaust gas streams of internal combustion engines, for example gasoline, light-duty diesel and heavy duty diesel engines. The catalyst compositions are also suitable for treatment of emissions from stationary industrial processes, removal of noxious or toxic substances from indoor air or for catalysis in chemical reaction processes.

The present articles, systems and methods are suitable for treatment of exhaust gas streams from mobile emissions sources such as trucks and automobiles. The present articles, systems and methods are also suitable for treatment of exhaust streams from stationary sources such as power plants.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted, unless other specific statements of incorporation are specifically provided.

The invention is now described with reference to the following examples, Before describing several exemplary embodiments of the invention, it is to be understood that the invention is not limited to the details of construction or process steps set forth in the following description. The invention is capable of other embodiments and of being practiced or being carried out in various ways.

EXPERIMENTAL

General Procedures

Mesopore (or matrix) and zeolitic (micropore) surface areas were determined via $N_2$-adsorption porosimetry on a Micromeritics TriStar 3000 series instrument, in accordance with ISO 9277 methods. The samples were degassed for a total of 6 hours (a 2 hour ramp up to 300° C. then held at 300° C. for 4 hours, under a flow of dry nitrogen) on a Micromeritics SmartPrep degasser. Nitrogen BET surface area is determined using 5 partial pressure points between 0.05 and 0.20. Zeolitic and matrix surface areas are determined using the same 5 partial pressure points and calculated using Harkins and Jura t-plot. Pores having diameter greater than 20 Å are considered to contribute to matrix surface area.

Diffuse reflectance Fourier transform infrared spectroscopy (DRIFTS) measurements were performed on a Thermo Nicolet FTIR with a MCT detector and a Harrick environmental chamber with ZnSe windows. The samples were ground into a fine powder with a mortar and pestle, and then filled into the sample cup. The sample powder was first dehydrated at 400° C. for 1 h in flowing Ar at the flow rate of 40 ml/min and then cooled down to 30° C. A spectrum was taken for the sample and KBr was used as reference.

Preparation of Small Pore Zeolite Materials

In all cases, the same Si and Al sources were used in the gel preparation, and crystallization was conducted in 2 L stirred autoclaves at autogenous pressure. The products were isolated by filtration, dried and calcined (540° C., 6 h) to yield the product (analyzed by XRD), which was subjected to single or multiple $NH_4^+$ exchanges until $Na_2O$ content reached <500 ppm. The gel compositions leading to comparative (Examples 1-3) and inventive (Examples 4-6) zeolitic materials as well as their corresponding product SARs are outlined in Table 4. All materials were synthesized at 170° C. with crystallization times ranging from 30-72 h.

Examples 1-3 (Comparative)

For each synthesis, trimethyladamantylammonium hydroxide (TMAdaOH) was the only OSDA used. The gel compositions (Si/Al ratio, OH/Si ratio, $H_2O$ to Si ratio) were varied for each Example as shown in Table 4. No $Na^+$ was added to the gel for Example 3. All crystallizations yielded products with >90% CHA phase crystallinity, and correspondingly high micropore surface areas (>500 m²/g). Material from Example 2 was calcined and used as seed for Examples 4-7 (the use of CHA seed in the synthesis gel is optional).

Example 4 (Comparative)

Comparative Example 4 illustrates an alternate Na-free synthesis approach where the gel and product SAR are different from that of the inventive examples. For this synthesis, trimethylcyclohexylammonium hydroxide (TMChAOH) was used as the OSDA. No $Na^+$ was added to the gel, although there was some Na present in the seed zeolite added for the crystallization, which explains the presence of Na in the product. Tetramethylammonium hydroxide (TMAOH) was added with a ratio of 0.09 with respect to Si; because tetramethylammonium was not found in the product, it is inferred that it did not act as a template for CHA zeolite formation. The crystallization yielded zeolite with >90% CHA phase crystallinity, and correspondingly high micropore surface area (>500 m²/g).

Examples 5-7 (Inventive)

Figure 5:
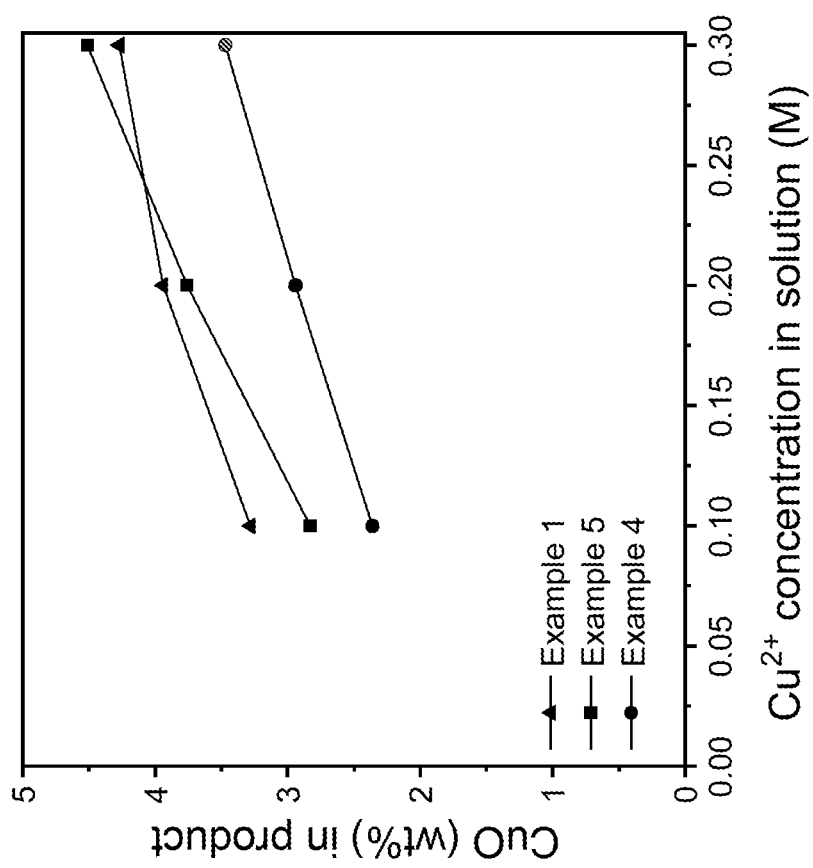
FIG. 5 is a copper-exchange isotherm for an embodiment of the disclosure.

For each synthesis, either hexamethonium dihydroxide (HMOH) or octamethonium dihydroxide (OMOH) was used as the first OSDA source, and TMAdaOH was used as the second OSDA source. No Na$^+$ was added to the gel for Examples 5 and 7, although there was some Na present in the seed zeolite added for the crystallization, which explains the presence of Na in the products. For example 6, Na$^+$ was added to the synthesis gel. Without wishing to be bound by theory, the different Na/Al ratio seen in the product zeolites may be indicative of a different aluminum distribution in these zeolite materials relative to comparative Examples 1-4. The crystallizations yielded zeolites with >90% CHA phase crystallinity, and correspondingly high micropore surface areas (>500 m$^2$/g).

slope which was significantly different from that of the material of Example 5 (FIG. 5). The uptake (measured as wt % of copper as CuO) at 0.1 M Cu$^{+2}$ concentration followed the expected trend (i.e., materials with higher Al content (lower SAR) show higher Cu uptake). However, at higher concentrations of Cu$^{2+}$ (e.g., at or above 0.2 M), inventive Example 5 showed significantly higher Cu uptake than expected based on the product SAR. This difference in equilibrium Cu uptake as compared to comparative CHA zeolites synthesized with just TMAda$^+$ or TMChA$^+$ is evidence of altered Al siting and pairing in the zeolite

TABLE 4

Synthesis Gel Compositions.

| Ex. | OSDA Identity | | Synthesis Gel Composition | | | | Product Properties | |
|---|---|---|---|---|---|---|---|---|
| # | OSDA-1 | OSDA-2 | SiO$_2$/Al$_2$O$_3$ | Na/Si | OSDA1/Si | OSDA2/Si | OH/Si | SiO$_2$/Al$_2$O$_3$ | Na/Al |
| 1 | N/A | TMAdaOH | 19.8 | 0.13 | N/A | 0.07 | 0.2 | 19.8 | 0.51 |
| 2 | N/A | TMAdaOH | 32.1 | 0.1 | N/A | 0.07 | 0.17 | 30.5 | 0.51 |
| 3 | N/A | TMAdaOH | 22.0 | N/A | N/A | 0.17 | 0.17 | 22.6 | 0 |
| 4 | N/A | TMChAOH | 28.0 | N/A | N/A | 0.15 | 0.24 | 27.1 | 0.05 |
| 5 | HMOH | TMAdaOH | 22.0 | N/A | 0.041 | 0.083 | 0.17 | 23.2 | 0.04 |
| 6 | HMOH | TMAdaOH | 22.0 | 0.1 | 0.041 | 0.083 | 0.17 | 21.9 | 0.22 |
| 7 | OMOH | TMAdaOH | 32.0 | N/A | 0.041 | 0.083 | 0.17 | 32.3 | 0.05 |

Without wishing to be bound by theory, it is believed that incorporation of a bis-quaternary ammonium compound (HMOH or OMOH) with a significantly different structure as compared to the mono-quaternary TMAdaOH typically used alone for synthesis of CHA zeolites is indicative of a different distribution of Al in the product zeolite, as compared to CHA zeolites synthesized with just TMAdaOH, or CHA zeolites synthesized with a mixture of two mono-quaternary ammonium compounds.

To further evaluate the extent of incorporation of each OSDA in the zeolite products, elemental analysis was performed on the washed, as-made products from inventive Example 4, Example 5 and Example 6. TMAdaOH, HMOH and OMOH have C/N molar ratios of 13, 6, and 7 respectively. Results of elemental analysis of Example 4, Example 5, and Example 6 showed product C/N molar ratios of 10.1, 11 and 11.4 respectively, showing that there was significant incorporation of both mono- and bis-quaternary ammonium OSDAs in the final product, prior to calcination, for all the inventive materials.

Further, as demonstrated by the increase of the C/N ratio for Example 4 versus Example 5, the concentration of Na$^+$ used can help control the degree of incorporation of bis-quaternary OSDA (and thus the Al distribution) in the CHA product. Specifically, the increase of the C/N ratio demonstrated that the addition of Na$^+$ to the synthesis gel used for inventive Example 5 reduced the incorporation of the bis-quaternary ammonium OSDA (HMOH) in the CHA zeolite product of inventive Example 5.

Example 8. Cu-Exchanged CHA Zeolite Materials

Materials from Example 1, Example 4, and Example 5 (each in the NH$_4^+$ form) were calcined at 450° C. for 6 h to yield the H$^+$ form of the CHA zeolites. Each sample was evaluated by Cu-exchange isotherm experiments and FTIR measurements on the Cu-exchanged samples. The Cu exchanges were performed using aqueous copper acetate solutions of different concentrations at 60° C. The isotherms for comparative Example 1 and Example 4 showed a similar product. As the density and distribution of catalytically active Cu sites in the zeolite depends on the siting and proximity of aluminum atoms within the zeolite framework structure, this increased Cu uptake suggests the presence of a greater concentration of closely located negatively charged aluminum species which effectively balance the positive charge of the copper species.

Figure 6:
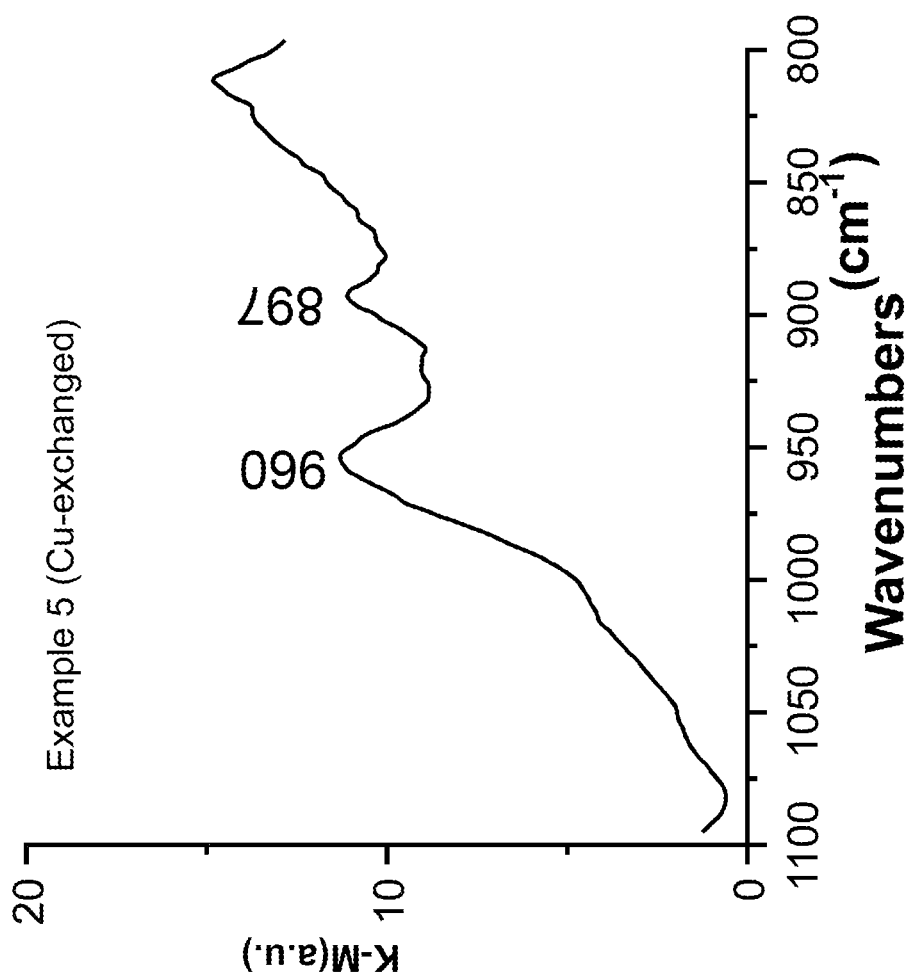
FIG. 6 is a DRIFTS measurement of T-O-T bond vibration for an embodiment of the disclosure.

Further evidence of altered Al siting and pairing for Example 5 was provided by DRIFTS measurements of T-O-T bond vibration of this material after Cu-exchange (FIG. 6). Typically, a peak at ~950 cm$^{-1}$ is assigned to the perturbed T-O-T bond vibration by [CuOH]$^+$ associated with a single Al site. For Example 5, this peak shifted to a higher wavenumber (960 cm$^{-1}$), indicating a slightly different environment of the [CuOH]$^+$ species in this material relative to comparative zeolite materials (e.g., those prepared with just TMAda$^+$ or TMChA$^+$ as the OSDA).

What is claimed is:

1. A method of synthesizing a small pore zeolite, the method comprising:
   preparing a mixture of water, an aluminum source, a silicon source, a source of a first organic structure-directing agent, and a source of a second organic structure-directing agent to form a synthesis gel; and
   subjecting the synthesis gel to a crystallization process to crystallize the small pore zeolite;
   wherein the first organic structure-directing agent comprises a bis-quaternary ammonium cation, a derivative of the bis-quaternary ammonium cation, or a combination thereof, and the second organic structure-directing agent comprises a mono-quaternary ammonium cation, a derivative of the mono-quaternary ammonium cation, or a combination thereof; and
   wherein the small pore zeolite has a crystalline framework structure type selected from the group consisting of AEI, AFT, AFX, AFV, AVL, CHA, EAB, ERI, ITW, KFI, LEV, LTA, MER, SAS, SAT, and SAV.

2. The method of claim 1, wherein the bis-quaternary ammonium cations are selected from the group consisting of N1,N1,N1,N3,N3,N3-hexaethylpropane-1,3-diaminium, N1,N1,N1,N4,N4,N4-hexamethylbutane-1,4-diaminium, N1,N1,N1,N4,N4,N4-hexaethylbutane-1,4-diaminium, (E)-N1,N1,N1,N4,N4,N4-hexamethylbut-2-ene-1,4-diaminium, N1,N1,N1,N5,N5,N5-hexamethylpentane-1,5-diaminium, (E)-N1,N1,N1,N5,N5,N5-hexamethylpent-2-ene-1,5-diaminium, N1,N1,N1,N6,N6,N6-hexamethylhexane-1,6-diaminium, (E)-N1,N1,N1,N6,N6,N6-hexamethylhex-2-ene-1,6-diaminium, (2E,4E)-N1,N1,N1,N6,N6,N6-hexamethylhexa-2,4-diene-1,6-diaminium, N1,N1,N1,N7,N7,N7-hexamethylheptane-1,7-diaminium, N1,N1,N1,N8,N8,N8-hexamethyloctane-1,8-diaminium, N1,N1,N1,N3,N3,N3-hexamethylcyclohexane-1,3-diaminium, N1,N1,N1,N3,N3,N3-hexamethylbicyclo[2.2.11heptane-1,3-diaminium, N1,N1,N1,N3,N3,N3-hexamethylbenzene-1,3-diaminium, N1,N1,N1,N4,N4,N4-hexamethylcyclohexane-1,4-diaminium, N1,N1,N1,N4,N4,N4-hexamethylbicyclo[2.2.11heptane-1,4-diaminium, N1,N1,N1,N4,N4,N4-hexamethylbicyclo[2.2.21octane-1,4-diaminium, N1,N1,N1,N4,N4,N4-hexamethylbenzene-1,4-diaminium, 1,1,4,4-tetramethylpiperazine-1,4-diium, 1,1,3,3-tetramethylhexahydropyrimidine-1,3-diium, 1,1'-(1,3-phenylene)bis(N,N,N-trimethylmethanaminium), 1,1'-(1,4-phenylene)bis(N,N,N-trimethylmethanaminium), or a combination thereof.

3. The method of claim 1, wherein the mono-quaternary ammonium cations are selected from the group consisting of tetraethylammonium, 2-hydroxy-N,N,N-trimethylethan-1-aminium, N,N,N-trimethylcyclohexanaminium, N,N,N-trimethyladamantan-1-aminium (TMAda), N,N,N-trimethylbicyclo[2.2.1] heptan-2-aminium, N,N,N-trimethylbenzenaminium, 1,1-dimethylpiperidin-1-ium, 1,1,3,5-tetramethylpiperidin-1-ium, 1-methylquinuclidin-1-ium, 3-hydroxy-1-methylquinuclidin-1-ium, or a combination thereof.

4. The method of claim 1, wherein the first organic structure-directing agent is a bis-quaternary ammonium compound comprising the bis-quaternary ammonium cations and balancing anions selected from the group consisting of OH—, Cl—, and Br and the source of the second organic structure-directing agent is a mono-quaternary ammonium compound comprising the mono-quaternary ammonium cations and balancing anions selected from the group consisting of OH—, Cl—, and Br.

5. The method of claim 1, wherein the source of the first organic structure-directing agent is hexamethonium dihydroxide (HMOH) or octamethonium dihydroxide (OMOH), and the source of the second organic structure-directing agent is N,N,N-trimethyladamantan-1-aminium hydroxide (TMAdaOH).

6. The method of claim 1, wherein the mixture further comprises an inorganic structure-directing agent, wherein the inorganic structure-directing agent is alkali metal cations or alkaline earth metal cations.

7. The method of claim 1, wherein the source of aluminum comprises one or more of an aluminum salt, aluminum metal, an aluminum oxide, an aluminosilicate, or a zeolite and the source of silicon is colloidal silica, a silicon alkoxide compound, an alkali metal silicate, fumed silica, amorphous silica, or an aluminosilicate.

8. The method of claim 1, wherein an OH/Si ratio of the synthesis gel is from about 0.03 to about 1.0.

9. The method of claim 1, wherein the crystallization process comprises maintaining the synthesis gel at a temperature of from about 90° C. to about 250° C.

10. The method of claim 1, further comprising filtering the crystals formed during the heating step, and further comprising calcining the zeolite at a temperature of from about 450° C. to about 750° C.

11. The method of claim 1, wherein the small pore zeolite has a silica-to-alumina ratio (SAR) of from about 6 to about 100.

12. The method of claim 1, wherein the small pore zeolite has a controlled aluminum distribution comprising an altered aluminum siting and pairing arrangement characterized by an altered equilibrium $Cu^{+2}$ uptake at a $Cu^{+2}$ concentration greater than 0.25M, as compared to a small pore zeolite synthesized with only a mono-quaternary OSDA, and wherein prior to calcining, at least a portion of the pores of the small pore zeolite are occupied by the bis-quaternary ammonium cations, and at least a portion of the pores are occupied by the mono-quaternary ammonium cations.

13. The method of claim 1, wherein from about 1 to about 99% of the pores are occupied by the bis-quaternary ammonium cations, and from about 99 to about 1% of the pores are occupied by the mono-quaternary ammonium cations.

* * * * *